(12) United States Patent
Trivedi

(10) Patent No.: US 11,851,620 B2
(45) Date of Patent: Dec. 26, 2023

(54) INTEGRATED PROCESS FOR THE MANUFACTURE OF RENEWABLE DIESEL

(71) Applicant: ExxonMobil Technology and Engineering Company, Annandale, NJ (US)

(72) Inventor: Kirtan K. Trivedi, Shenandoah, TX (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 0 days.

(21) Appl. No.: 17/930,479

(22) Filed: Sep. 8, 2022

(65) Prior Publication Data

US 2023/0159835 A1 May 25, 2023

Related U.S. Application Data

(60) Provisional application No. 63/264,379, filed on Nov. 22, 2021.

(51) Int. Cl.
*C10G 45/02* (2006.01)

(52) U.S. Cl.
CPC ..... *C10G 45/02* (2013.01); *C10G 2300/1014* (2013.01); *C10G 2400/04* (2013.01)

(58) Field of Classification Search
None
See application file for complete search history.

(56) References Cited

U.S. PATENT DOCUMENTS

| 10,414,990 B1* | 9/2019 | Sachan | C10G 45/58 |
| 2004/0230085 A1* | 11/2004 | Jakkula | C10G 3/45 |
| | | | 585/240 |
| 2009/0077866 A1* | 3/2009 | Kalnes | C10G 3/50 |
| | | | 44/308 |

(Continued)

FOREIGN PATENT DOCUMENTS

EP      3 702 432 A1      9/2020

OTHER PUBLICATIONS

International Search Report and Written Opinion received for PCT Patent Application No. PCT/US2022/076086, dated Dec. 8, 2022, 12 pages.

*Primary Examiner* — Ali Z Fadhel
(74) *Attorney, Agent, or Firm* — Shook, Hardy & Bacon L.L.P.

(57) ABSTRACT

Methods and systems are provided for producing renewable diesel. Disclosed herein is an example method of method for integration of product separation in renewable diesel production, including: stripping a hydrotreated effluent stream comprising hydrotreated biofeedstock to remove isomerization contaminants and form at least an isomerization feed stream and a first gas stream; contacting an isomerization effluent with the first gas stream such that the isomerization effluent adsorbs at least C4+ hydrocarbons from the first gas stream; and stripping at least a portion of an isomerization effluent while separated from the stripping the hydrocarbon stream by a dividing wall to remove hydrocarbons having 10 carbons or less and form at least a product stream and a second gas stream, wherein the product stream comprises renewable diesel.

20 Claims, 6 Drawing Sheets

(56) References Cited

U.S. PATENT DOCUMENTS

| | | | |
|---|---|---|---|
| 2009/0077867 A1* | 3/2009 | Marker | C01B 3/16 44/308 |
| 2009/0193709 A1* | 8/2009 | Marker | C10L 1/08 44/308 |
| 2010/0058648 A1* | 3/2010 | Marker | C10G 3/52 44/307 |
| 2011/0219669 A1* | 9/2011 | Hanks | C10G 65/04 44/307 |
| 2015/0001129 A1* | 1/2015 | Kokayeff | C10G 65/12 208/89 |
| 2017/0283350 A1 | 10/2017 | Schmidt et al. | |
| 2020/0181504 A1* | 6/2020 | Myllyoja | C10M 105/06 |
| 2020/0277531 A1* | 9/2020 | Wexler | C10G 65/04 |
| 2022/0010220 A1* | 1/2022 | Debonis | C10L 3/12 |
| 2022/0098500 A1* | 3/2022 | Suntio | C10G 3/50 |
| 2022/0127537 A1* | 4/2022 | Bozzano | C10G 3/42 |
| 2022/0315846 A1* | 10/2022 | Ackerson | B01D 17/0214 |
| 2022/0411702 A1* | 12/2022 | Sarjovaara | C10L 1/08 |
| 2023/0014266 A1* | 1/2023 | Myllyoja | C07C 7/13 |

* cited by examiner

INTEGRATED PROCESS FOR THE MANUFACTURE OF RENEWABLE DIESEL

CROSS-REFERENCE TO RELATED APPLICATIONS

This application claims the benefit of U.S. Provisional Application No. 63/264,379, filed on Nov. 22, 2021, the entire contents of which are incorporated herein by reference.

FIELD

This application relates to hydroprocessing of biofeedstocks to produce a renewable diesel product.

BACKGROUND

Renewable diesel is a hydrocarbon fuel made from vegetable oils, fats, greases, or other suitable biofeedstocks. In contrast to biodiesels, renewable diesels are not esters and are chemically similar to petroleum diesels. In some instances, renewable diesel can be used as a blendstock for blending with petroleum diesel. While a number of different techniques can be used for renewable diesel production, an example process includes hydrodeoxygenation of a biofeedstock followed by isomerization. Since hydrodeoxygenation generates a number of components, including water, carbon monoxide and carbon dioxide, to which the isomerization catalyst can be sensitive, the feed to the isomerization reactor from hydrotreatment is typically stripped in a stripper. In addition, the product from the isomerization is also typically cooled and stripped in a separate column. Unfortunately, conversion of the biofeedstocks to renewable diesel in conventional processing equipment can be expensive.

SUMMARY

Disclosed herein is an example method of processing a biofeedstock, including: hydrotreating the biofeedstock by reaction with hydrogen in the presence of a hydrodeoxygenation catalyst to form at least a hydrotreated effluent stream; cooling the hydrotreated effluent stream; separating a gas-phase portion from at least the cooled hydrotreated effluent stream to form at least a gas-phase stream and a hydrotreated stream; stripping at least a portion of the hydrotreated stream to remove isomerization contaminants and form at least an isomerization feed stream and a first gas stream; contacting at least a portion of the isomerization feed stream with an isomerization catalyst to form an isomerization effluent stream; separating at least the isomerization effluent stream to form at least a first gas stream and an isomerization reactor effluent; contacting at least a portion of the isomerization reactor effluent with the first gas stream such that the isomerization reactor effluent adsorbs at least hydrocarbons having 4 carbons are more from the first gas stream; and stripping at least a portion of the isomerization effluent stream to form at least a product stream and a second gas stream, wherein the product stream comprises renewable diesel and has a minimum flash point of about 35° C. to about 60° C. as determined in accordance with ASTM D93.

Disclosed herein is an example method of method for integration of product separation in renewable diesel production, including: stripping a hydrotreated effluent stream comprising hydrotreated biofeedstock to remove isomerization contaminants and form at least an isomerization feed stream and a first gas stream; contacting an isomerization effluent with the first gas stream such that the isomerization effluent adsorbs at least C4+ hydrocarbons from the first gas stream; and stripping at least a portion of an isomerization effluent in an integrated stripper while separated from the stripping the hydrocarbon stream by a dividing wall to remove hydrocarbons having 10 carbons or less and form at least a product stream and a second gas stream, wherein the product stream comprises renewable diesel.

These and other features and attributes of the disclosed methods, systems, and apparatus of the present disclosure and their advantageous applications and/or uses will be apparent from the detailed description which follows

BRIEF DESCRIPTION OF THE DRAWINGS

To assist those of ordinary skill in the relevant art in making and using the subject matter hereof, reference is made to the appended drawings, wherein.

DETAILED DESCRIPTION

Figure 1:
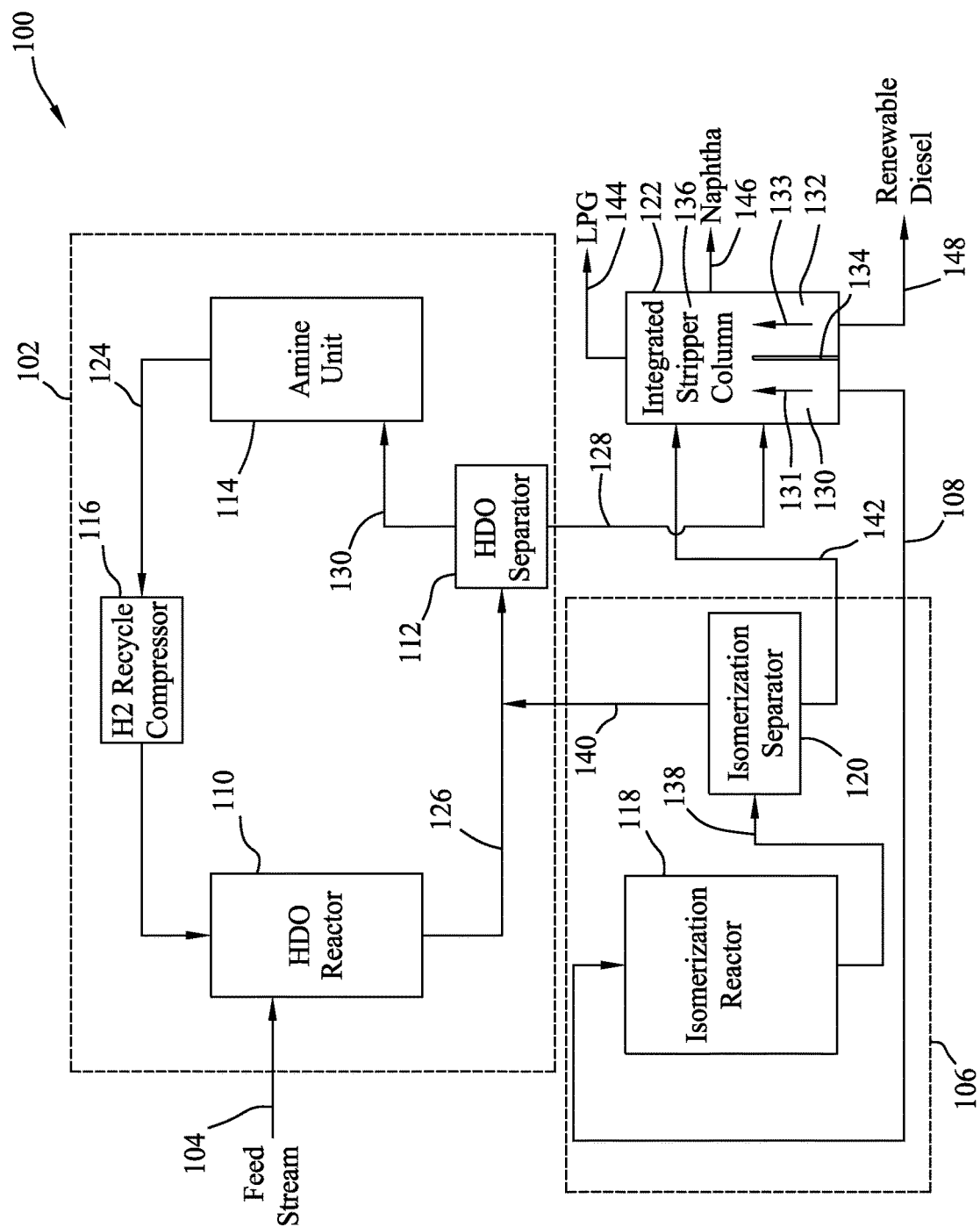
FIG. 1 is a schematic illustration of an example renewable diesel production system in accordance with one or more illustrative embodiments.

In various embodiments, methods and systems are provided for producing renewable diesel. Renewable diesel is a hydrocarbon made from biofeedstocks, including vegetable oils, fats, greases, or other sources of triglycerides, which can include various crops, waste oil, used cooking oil or other animal fats. As used herein, the term "renewable diesel" refers to a hydrocarbon liquid produced from a biofeedstock and with paraffins (e.g., iso and normal) as a major component. Because renewable diesel is chemically similar to petroleum diesel, renewable diesel is capable of use in diesel engines without engine modification. In one example, a renewable diesel includes between 50% to 99% by weight of paraffins. A 100% renewable diesel should meet the ASTM D975 specification for diesel fuel.

Example embodiments for renewable diesel production include hydrodeoxygenation ("HDO") stage and an isomerization stage. In example embodiments of the HDO stage, a biofeedstock is converted by reaction with hydrogen to form, for example, paraffin products with removal of oxygen. Particular embodiments for renewable diesel production further include an isomerization stage that receives hydrotreated biofeedstock from the HDO stage. In example embodiments of the isomerization stage, the hydrotreated biofeedstock is catalytically isomerized, for example, by isomerization of long chain paraffinic molecules, such as molecules ranging from 10 carbons long to 24 carbons long or from 10 carbons long to 19 carbons long or from 15 carbons long to 19 carbons long.

However, the processing equipment needed for producing renewable diesel is typically capital intensive due to the particular process requirements, thus making it challenging to economically produce renewable diesel. For example, components such as water, carbon monoxide and carbon dioxide generated in the HDO stage are removed from the feed to the isomerization reactor as these components can be poisons to the isomerization catalyst. In addition, the product from the isomerization reactor can also be stripped to provide a renewable diesel with desired specifications. By integration of the product separation schemes into an integrated stripper, example embodiments reduce the amount of equipment required to produce renewable diesel. For example, both a hydrocarbon stream from the HDO stage and an isomerization effluent stream are fed to an integrated stripper. In some embodiments, the integrated stripper includes a divided wall column. In example embodiments, the hydrocarbon stream from the HDO stage is stripped in the integrated stripper, for example, to meet constraints of the isomerization reactor, such as carbon monoxide, carbon dioxide, and/or water constraints. In example embodiments, the isomerization effluent stream is also stripped in the integrated stripper, for example, to remove lighter hydrocarbons (e.g., 10 hydrocarbons or less) to meet a flash point requirement of the renewable diesel. For example, the renewable diesel can have a minimum flash point of 35° C. to 60° C. or from 38° C. to 55° C. As used herein, flash point is determined in accordance with ASTM D93. Before stripping, examples include contacting the isomerization effluent stream with gas from stripping the hydrocarbon stream such that higher value molecules (e.g., hydrocarbons ranging from C10 to C15) are absorbed. To further reduce equipment requirements, the integrated stripper has certain design features in accordance with present embodiments. In some embodiments, the integrated stripper includes a condenser (e.g., spiral condenser) mounted in the top of the column, reducing need for reflux drum and associated pumps.

Another challenge posed by the production of renewable diesel is due to the cooling requirements of the HDO reactor. By way of further example, removal of oxygen from biofeedstocks typically results in a large, localized heat release. As a result, conventional methods for deoxygenation include a substantial amount of product recycle with corresponding increases in equipment sizes (e.g., reactor, compressors, pumps, etc.). However, by splitting the biofeedstock across the catalyst beds instead of introducing the feedstock into the HDO reactor above the initial catalyst bed, example embodiments assist in maintaining a desired temperature profile across the HDO reactor. Example embodiments further control temperature in the HDO reactor by use of product recycle to provide cooling between catalyst beds, thus reducing or minimizing hydrogen circulation relative to embodiments where a hydrogen quench gas may be used for cooling between catalyst beds.

Yet another challenge posed by production of renewable diesel is the desulfidation of the catalyst used in the HDO reactor due the low sulfur content of biofeedstocks as compared to feedstocks conventionally used in conventional hydroprocessing reactors. In accordance with present embodiments, the biofeedstocks are hydrodeoxygenated while maintaining the HDO catalyst in a sulfided state. In some embodiments, the hydrogen gas used for hydrodeoxygenation is formed at least in part from hydrogen that has been used as a stripping gas for removing $H_2S$ from a rich amine stream. In such embodiments, the hydrogen recycle loop for the HDO stage can be integrated with the amine absorber loop for one or more associated processes. In some embodiments, the resulting hydrogen-containing stream includes sufficient $H_2S$ to substantially maintain the catalyst in the hydrodeoxygenation stage in a sulfided state.

Example Configurations

FIG. 1 is a schematic illustration of a system 100 for renewable diesel production in accordance with some embodiments. In the illustrated embodiment, the system 100 includes the following stages: (i) an HDO stage 102 in which a feed stream 104 containing a biofeedstock is reacted with hydrogen to reduce oxygen in the biofeedstock; and (ii) an isomerization stage 106 that receives an isomerization feed stream 108 containing hydrocarbons from the HDO stage 102 and isomerizes the hydrocarbons to improve the cold flow properties of a distillate boiling range portion of the hydrocarbons. In some embodiments, the HDO stage 102 includes an HDO reactor 110, an HDO separator 112, and amine unit 114, and a hydrogen recycle compressor 116. In some embodiments, the isomerization stage 106 includes an isomerization reactor 118 and an isomerization reactor effluent separator 120. As illustrated, the system 100 includes an integrated stripper 122 for an integrated scheme for the HDO stage 102 and the isomerization stage 106.

In the illustrated embodiment, a feed stream 104 including a biofeedstock is introduced into the HDO reactor 110. As illustrated, hydrogen treat gas stream 124 including hydrogen is also be introduced into the HDO reactor 110. While not shown on FIG. 1, example embodiments include make-up hydrogen (e.g., make-up hydrogen gas 648 on FIG. 6) to provide additional hydrogen for the HDO reactor 110. While FIG. 1 illustrates separate addition of the feed stream 104 and the hydrogen treat gas stream 124 to the HDO reactor 110, some embodiments include combination of the feed stream 104 and the hydrogen treat gas stream 124 prior to the HDO reactor 110. In accordance with example embodiments, the biofeedstock is exposed to hydrodeoxygenation conditions in the HDO reactor 110 in the presence of one or more catalyst beds that contain hydrodeoxygenation catalyst such that the biofeedstock reacts with the hydrogen to reduce oxygen in the biofeedstock. The reaction in the HDO reactor 110 should produce hydrotreated biofeedstock, including paraffins, reaction intermediates (if any), and unreacted biofeedstock (if any) and hydrogen. The paraffins include, for example, long chain paraffinic molecules, such as molecules ranging from 10 carbons long to 24 carbons long or from 10 carbons long to 19 carbons long or from 15 carbons long to 19 carbons long. Lighter hydrocarbons having 9 or few carbons are also produced in the HDO reactor 110, including methane, ethane, and propane, for example. The hydrodeoxygenation can be used to substantially deoxygenate the biofeedstock. This corresponds to removing 90% or more, for example, 95% or more, 98% or more, 99% or more, 99.5% or more, 99.9% or more, or completely (measurably) all the oxygen present in the biofeedstock. Alternately, substantially deoxygenating the biofeedstock can correspond to reducing the oxygenate level of the hydrotreated biofeedstock to 0.1 wt. % or less, for example, 0.05 wt. % or less, 0.03 wt. % or less, 0.02 wt. % or less, 0.01 wt. % or less, 0.005 wt. % or less, 0.003 wt. % or less, 0.002 wt. % or less, or 0.001 wt. % or less.

In the illustrated embodiments, a hydrotreated effluent stream 126 including hydrotreated biofeedstock is withdrawn from the HDO reactor 110 and flowed to an HDO separator 112, where a gas-phase portion is separated from liquid-phase products. While not shown, some embodiments include cooling the hydrotreated effluent stream 126 prior to separation. In the illustrated embodiment, the HDO separator 112 produces a hydrotreated stream 128 including hydrocarbons (e.g., C1+ paraffins) and a gas-phase stream 129. The particular components in the hydrotreated stream 128 and gas-phase stream 129 will depend on number of factors, including the operating conditions of the HDO separator 112 and the pressure and temperature of the isomerization reactor effluent separator 120. In some embodiments, the HDO separator 112 operates at a temperature of 1° C. to 100° C. (e.g., 35° C. to 80° C., 45° C. to 75° C.) and a pressure of 3000 kPa to 8500 kPa (e.g., 4000 kPa to 5000 kPa). In some embodiments, the hydrocarbons in the hydrotreated stream 128 include long chain hydrocarbons (e.g., paraffins) from 10 carbons long to 24 carbons long or from 10 carbons long to 19 carbons long or from 15 carbons long to 19 carbons long. In some embodiments, the hydrotreated stream also includes lighter hydrocarbons having 9 or few carbons, including methane, ethane, or propane, for example.

The gas-phase stream 129 can contain hydrogen, for example, that can be recycled to the HDO reactor 110. As illustrated, some embodiments include passing the gas-phase stream 129 to an amine unit 114. In some embodiments of the amine unit 114, hydrogen sulfide is incorporated into the gas-phase stream 129 to provide a hydrogen treat gas stream 124 that contains hydrogen and hydrogen sulfide. In accordance with example embodiments, the amine unit 114 also removes contaminant gases from the gas-phase stream 129, such as ammonia, $H_2S$, carbon monoxide, and/or carbon dioxide, that were generated in the HDO reactor 110. In some embodiments, the hydrogen treat gas stream 124 from the amine unit 114 is compressed by hydrogen recycle compressor 116 and then recycled to the HDO reactor 110. By incorporation of hydrogen sulfide into the hydrogen treat gas stream 124, the hydrogen treat gas stream 124, for example, contains sufficient hydrogen sulfide to substantially maintain the catalysts in the HDO reactor 110 in a sulfided state.

In the illustrated embodiment, the hydrotreated stream 128 including hydrocarbons is passed to the integrated stripper 122. While the hydrotreated stream 128 is liquid, in some embodiments, when separated in the HDO separator 112, example embodiments include at least a portion of the hydrotreated stream 128 being gas as when passed to the integrated stripper 122. In FIG. 1, the integrated stripper 122 includes a first separate volume 130 and a second separate volume 132. A dividing wall 134 separates the first separate volume 130 and the second separate volume 132. The integrated stripper 122 further includes a common volume 136. The hydrotreated stream 128 from the HDO stage 102 can enter the first separate volume 130. A liquid output from the first separate volume 130 can be passed to the isomerization stage 106 as the isomerization feed stream 108. In the first separate volume 130, the hydrocarbons in the hydrotreated stream 128 can be stripped to remove isomerization contaminants to form the isomerization feed stream 108 and the first gas stream 131 using a first stripping medium 212 (e.g., FIG. 2). In some embodiments, the hydrotreated stream 128 is stripped to form an isomerization feed stream 108 with reduced isomerization contaminants, such as carbon monoxide, carbon dioxide, and water. For example, the hydrotreated stream 128 can be stripped to provide an isomerization feed stream 108 with a total oxygen content of 0.4 wt. % or less. In some embodiments, the total oxygen content of the isomerization feed stream 108 is 0.1 wt. % or less. In some embodiments, the total oxygen content of the isomerization feed stream 108 ranges from 0.001 wt. % to 0.1 wt. %. The total-oxygen content includes oxygen from oxygen-containing compounds.

The isomerization feed stream 108 can then be passed to the isomerization reactor 118. In the isomerization reactor, catalytic isomerization can be performed by exposing the stripped hydrocarbon in the isomerization feed stream 108 to an isomerization catalyst under effective isomerization conditions. While not shown, some embodiments include adding hydrogen to the isomerization reactor 118 such that the isomerization takes place in the presence of hydrogen. In the illustrated embodiment, an isomerization reactor product stream 138 is withdrawn from the isomerization reactor 118 and passed to the isomerization reactor effluent separator 120. While not shown, embodiments include cooling the isomerization reactor product stream 138 prior to separation. In some embodiments, the isomerization reactor product stream 138 contains paraffins (e.g., normal and iso), hydrogen, and light hydrocarbons (e.g., C1-C4 hydrocarbons). In the isomerization reactor effluent separator 120, some embodiments include separating the liquid-phase products in the isomerization reactor product stream 138 from the gas-phase products to form a gas stream 140 and an isomerization reactor effluent 142. The particular composition of the gas stream 140 and isomerization reactor effluent 142 depend, for example, on the conditions of the isomerization reactor effluent separator 120. In some embodiments, the isomerization reactor effluent separator 120 operates at a temperature of 100° C. to 350° C. (e.g., 175° C. to 275° C., 200° C. to 250° C.) and a pressure of 2500 kPa to 7000 kPa (e.g., 3000 kPa to 5500 kPa, 4000 kPa to 5000 kPa). In the illustrated embodiment, the gas stream 140 including hydrogen and light hydrocarbons (e.g., C1-C4+ hydrocarbons) is combined with the hydrotreated effluent stream 126 with the combined stream passed to the HDO separator 112.

In the illustrated embodiment, the isomerization reactor effluent 142 is passed to the integrated stripper 122. In FIG. 1, the isomerization reactor effluent 142 from the isomerization stage 106 enters the common volume 136 where it contacts the first gas stream 131 from the first separate volume 130. The isomerization reactor effluent 142 absorbs, for example, C4+ hydrocarbons from the first gas stream 131. In some embodiments, the common volume 136 also receives a second gas stream 133 from the second separate volume 132. In the illustrated embodiment, the common volume 136 produces a light ends stream 144 and a naphtha product stream 146. In some embodiments, the light ends stream 144 include hydrocarbons, for example, from 1 carbon long to 6 carbons long. In some embodiments, the naphtha product stream 146 include hydrocarbons, for example, from 4 carbons long to 12 carbons long. In the illustrated embodiment, the isomerization reactor effluent 142 with the absorbed C4+ hydrocarbons is passed to the second separate volume 132 of the integrated stripper 122. In the second separate volume 132, for example, the isomerization reactor effluent 142 is stripped to remove lighter components and provide a renewable diesel with a desirable flash point. For example, liquid isomerization effluent can be stripped of lighter component to provide a product stream 148 including renewable diesel with a desirable flash point, such as a minimum flash point of 35° C. to 60° C. or from 38° C. to 55° C. As illustrated, the product stream 148 including renewable diesel is withdrawn from the integrated stripper 122. In accordance with present embodiments, the renewable diesel includes, for example, long chain hydrocarbons, such as long chain hydrocarbons (e.g., paraffins and iso-paraffins) ranging from 10 carbons long to 24 carbons long or from 10 carbons long to 19 carbons long or from 15 carbons long to 19 carbons long.

Figure 2:
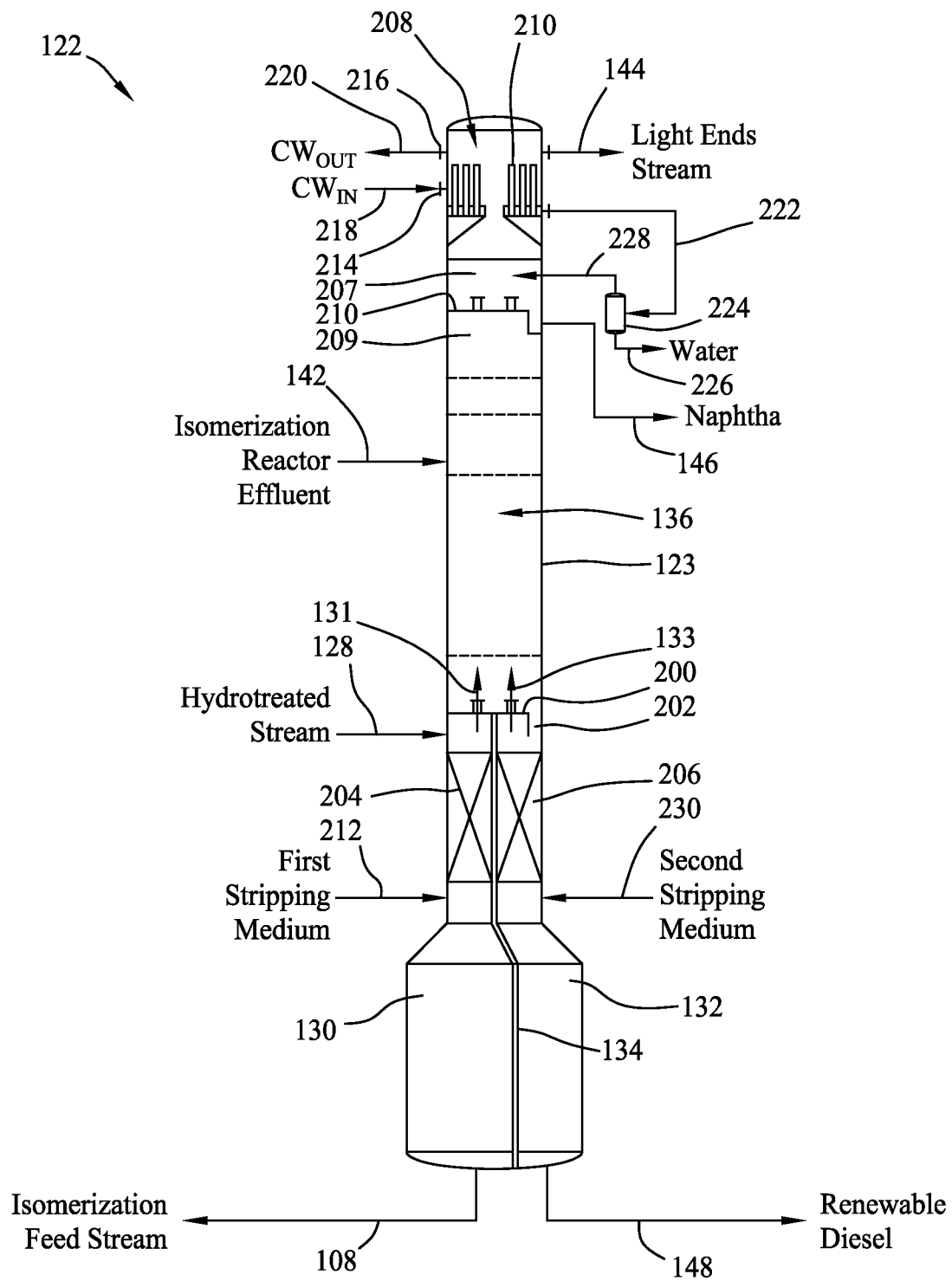
FIG. 2 is a schematic illustration of an integrated stripper in accordance with one or more illustrative embodiments.

FIG. 2 is a schematic illustration of an integrated stripper 122 in accordance with one or more embodiments. The integrated stripper 122 is used, for example, in a process for renewable diesel production to integrate product separation schemes. Integration of product separation into an integrated stripper 122 reduces, for example, capital requirements for renewable diesel production by reducing the amount and type of process equipment that may be needed. It should be understood that the illustration of FIG. 2 is an example configuration of the integrated stripper 122 and that other configurations can be used that are suitable for integration of the product separation schemes.

In the illustrated embodiment, the integrated stripper 122 includes a column 123, including a first separate volume 130, a second separate volume 132, and a common volume 136. In some embodiments, the first separate volume 130 and the second separate volume 132 are separated by a dividing wall 134 that prevents intermixing of fluids in each section. As illustrated, tray 200 is positioned at the top of the first and second separate volumes 130, 132 to separate them from the common volume that allows gas flow to the common volume but does not allow downward liquid flow into first separate volume 130. While FIG. 2 illustrates, a single tray 200 extending across both the first and second separate volumes 130, 132, some embodiments include multiple trays. Tray 200 can be any of a variety of suitable designs for preferentially allowing gas flow, including, but not limited to, chimney tray or bubble cap trays and valve trays. In some embodiments, the second separate volume 132 includes a downcomer 202 to allow downward liquid flow from the common volume 136 to the second separate volume 132. In some embodiments, the first and second separate volumes 130, 132 include equipment disposed therein to promote vapor-liquid mass transfer. Examples of suitable equipment include trays and packing. For example, first separate volume 130 may include first packing section 204, and the second separate volume 132 may include second packing section 206.

In the illustrated embodiment, the integrated stripper 122 further includes a condenser 208. In the illustrated embodiment, the common volume 136 includes an upper section 207 and a lower section 209. In some embodiments, a tray 210 is positioned between the upper section 207 and the lower section 209 of the common volume 136. Any suitable tray 210 can be used, including, but not limited to a chimney tray or bubble cap trays and valve trays. As illustrated, the condenser 208, in some embodiments, is positioned in the upper section 207 of the common volume 136. The condenser 208 may include any suitable heat transfer device, such as coil and spiral condensers. In the illustrated embodiment, the condenser 208 is in the form of a spiral condenser.

In operation, the integrated stripper 122 receives various inputs. In example embodiments, one input is the hydrotreated stream 128 including predominantly long chain hydrocarbons (e.g., long chain hydro C10 hydrocarbons) from the HDO stage 102 (e.g., shown on FIG. 1). In example embodiments, hydrotreated stream 128 also includes the absorbed light end molecules (e.g., C9 hydrocarbons or lighter). In some embodiments, the hydrotreated stream 128 is introduced into the first separate volume 130 of the column 123. In some embodiments, a first stripping medium 212 is also introduced into the first separate volume 130 of the column 123. The first stripping medium 212 can include any of a variety of suitable stripping agents, including, but not limited to, steam, nitrogen, inert gases, and hydrocarbon gases. In some embodiments, the first stripping medium 212 includes natural gas. The hydrotreated stream 128 is stripped by the first stripping medium 212, for example, to remove isomerization contaminants, such as carbon monoxide, carbon dioxide, and water. For example, the hydrotreated stream 128 and the first stripping medium 212 are contacted in a countercurrent manner, for example, across the first packing section 204. This results in formation of at least a first gas stream 131 and an isomerization feed stream 108 with reduced (or minimized) contaminants. In the illustrated embodiment, the isomerization feed stream 108 is withdrawn from the column 123 and passed to the isomerization stage 106 (e.g., shown on FIG. 1). In the illustrated embodiment, the first gas stream 131 passes through tray 200 to the common volume 136.

In the illustrated embodiment, an additional input to the integrated stripper 122 is the isomerization reactor effluent 142 from the isomerization stage 106 (e.g., shown on FIG. 1). As illustrated, the isomerization reactor effluent 142 can be introduced into the common volume 136 of the column 123. In the common volume, some embodiments contact the isomerization reactor effluent 142 and the first gas stream 131 from the first separate volume 130 in a countercurrent manner. This results in absorption of C4+ hydrocarbons from the first gas stream 131 into the isomerization reactor effluent 142. In the illustrated embodiment, the common volume 136 also receives a second gas stream 133 from the second separate volume 132. Vapor in the common volume 136 flows upward through tray 210 into the condenser 208. In some embodiments, a coolant is introduced into the condenser 208. In the illustrated embodiment, the condenser 208 includes a cooling water inlet 214 and a cooling water outlet 216 connection through which an inlet cooling water stream 218 is fed to the condenser 208 and outlet cooling water stream 220 is removed from it. From the condenser 208, a light ends stream 144, a water-hydrocarbon mixture 222, and a naphtha product stream 146 is withdrawn in accordance with example embodiments. In the illustrated embodiments, the water-hydrocarbon mixture 222 are passed to a separator 224 to produce a water stream 226 and a hydrocarbon stream 228, wherein the hydrocarbon stream 228 is returned to the column 123 above the tray 210.

In the illustrated embodiment, the isomerization reactor effluent 142 from the common volume 136 with the absorbed C4+ hydrocarbons is passed to the second separate volume 132 of the column 123. A second stripping medium 230 can also be introduced into the second separate volume 132. The second stripping medium 230 can include any of a variety of suitable stripping agents, including, but not limited to, steam, nitrogen, inert gases, and hydrocarbon gases. In the illustrated embodiment, the isomerization reactor effluent 142 is stripped by the second stripping medium 230 to remove lighter components, such as hydrocarbons having less than 10 carbons. For example, example embodiments include contacting the isomerization reactor effluent 142 and the second stripping medium 230 in a countercurrent manner, for example, across the second packing section 206. This results in formation of at least a second gas stream 133 and a product stream 148. In the illustrated embodiment, the second gas stream 133 is passed to the common volume 136, while the product stream 148 is withdrawn from the column 123. In accordance with present embodiments, the product stream 148 includes renewable diesel.

Figure 3:
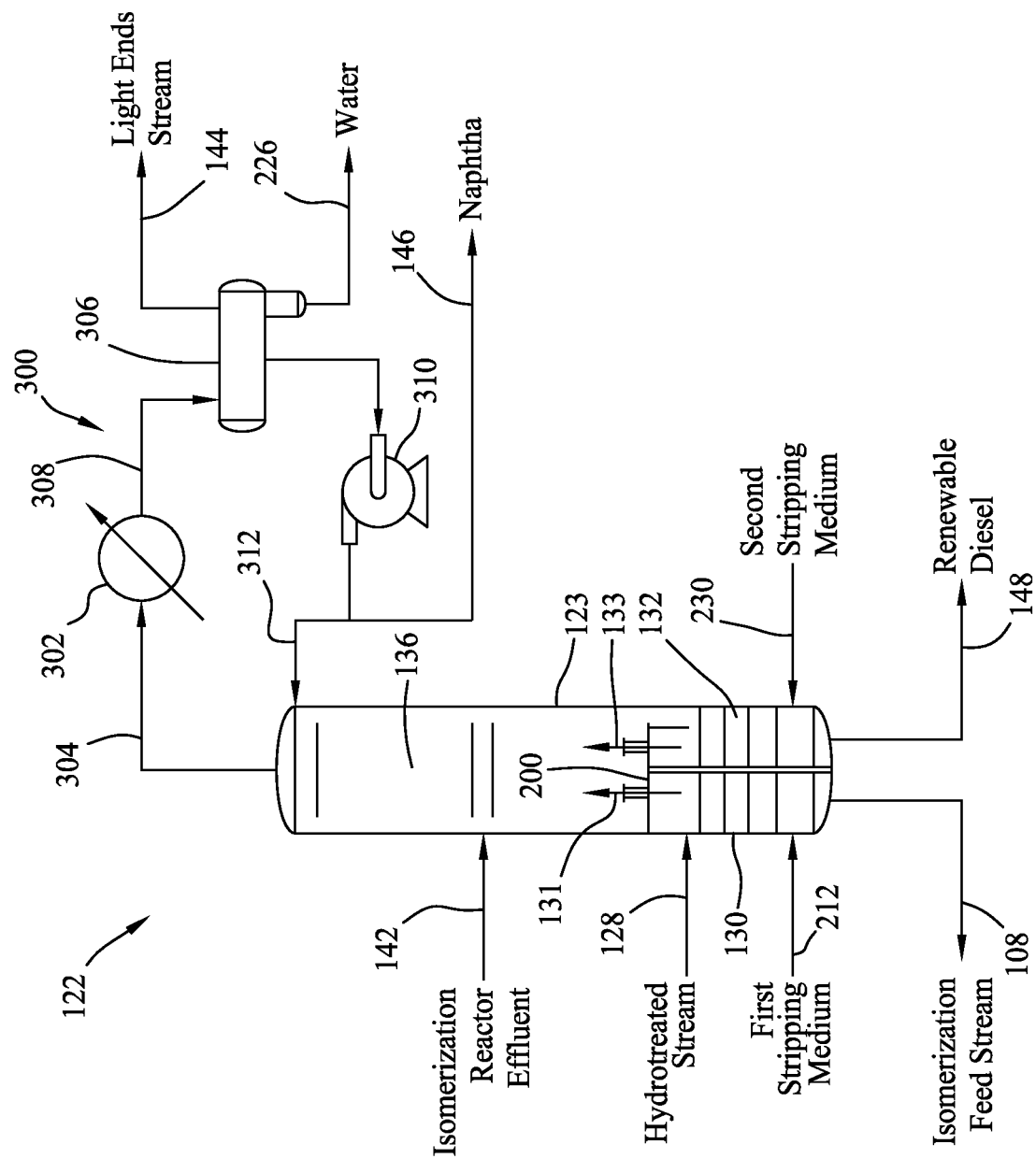
FIG. 3 is a schematic illustration of an integrated stripper in accordance with one or more illustrative embodiments.

FIG. 3 is a schematic illustration of an alternative configuration of the integrated stripper 122 in accordance with one or more embodiments. In FIG. 3, the integrated stripper 122 includes a reflux system 300 that includes an external condenser 302 that cools an overhead gas stream 304 from the column 123. The reflux system 300 also includes a reflux drum 306 that receives the cooled overhead stream 308 and a reflux pump 310 that pressurizes a liquefied hydrocarbon reflux 312 from the reflux drum 306 for return to the column 123.

In operation, example embodiments include introducing the hydrotreated stream 128 into the first separate volume 130 of the column 123. In some embodiments, the hydrotreated stream 128 is stripped in the first separate volume 130 by the first stripping medium 212 to remove contaminants that impact the run length of the isomerization catalyst and form an isomerization feed stream 108 and a first gas stream 131. In the illustrated embodiment, the isomerization feed stream 108 is withdrawn from the column 123 and passed to the isomerization stage 106 (e.g., shown on FIG. 1). As illustrated, the first gas stream 131 passes through tray 200 to the common volume 136. As illustrated, example embodiments also include introducing the isomerization reactor effluent 142 into the common volume 136 of the column 123. In the common volume 136, example embodiments include contacting the isomerization reactor effluent 142 and the first gas stream 131 from the first separate volume 130 in a countercurrent manner. This results in absorption of C4+ hydrocarbons from the first gas stream 131 into the isomerization reactor effluent 142. In the illustrated embodiment, the isomerization reactor effluent 142 from the common volume 136 with the absorbed C4+ hydrocarbons are passed to the second separate volume 132 of the column 123 where it is stripped by the second stripping medium 230 to remove lighter components and form the second gas stream 133 and the product stream 148 including renewable diesel. In some embodiments, the second gas stream 133 is passed through tray 200 to the common volume 136.

In the illustrated embodiment, an overhead gas stream 304 is withdrawn from the column 123 and passed to the external condenser 302 of the reflux system 300. In accordance with example embodiments, the external condenser 302 cools and at least partially condenses the overhead gas stream 304. In the illustrated embodiment, the cooled overhead gas stream 308 is passed to the reflux drum 306. In accordance with present embodiments, the reflux drum 306 functions as gas-liquid separator to separate lighter hydrocarbons and other gases from water and heavier hydrocarbons in the cooled overhead gas stream 308. From the reflux drum 306, in the illustrated embodiment, a light ends stream 144 and produced water stream 226 are withdrawn. In some embodiments, the remainder liquid in the reflux drum 306 is a hydrocarbon liquid that is pressurized by reflux pump 310 and returned to the column as liquefied hydrocarbon reflux 312. In the illustrated embodiment, a portion of the liquefied hydrocarbon reflux 312 is recovered as naphtha product stream 146.

Figure 4:
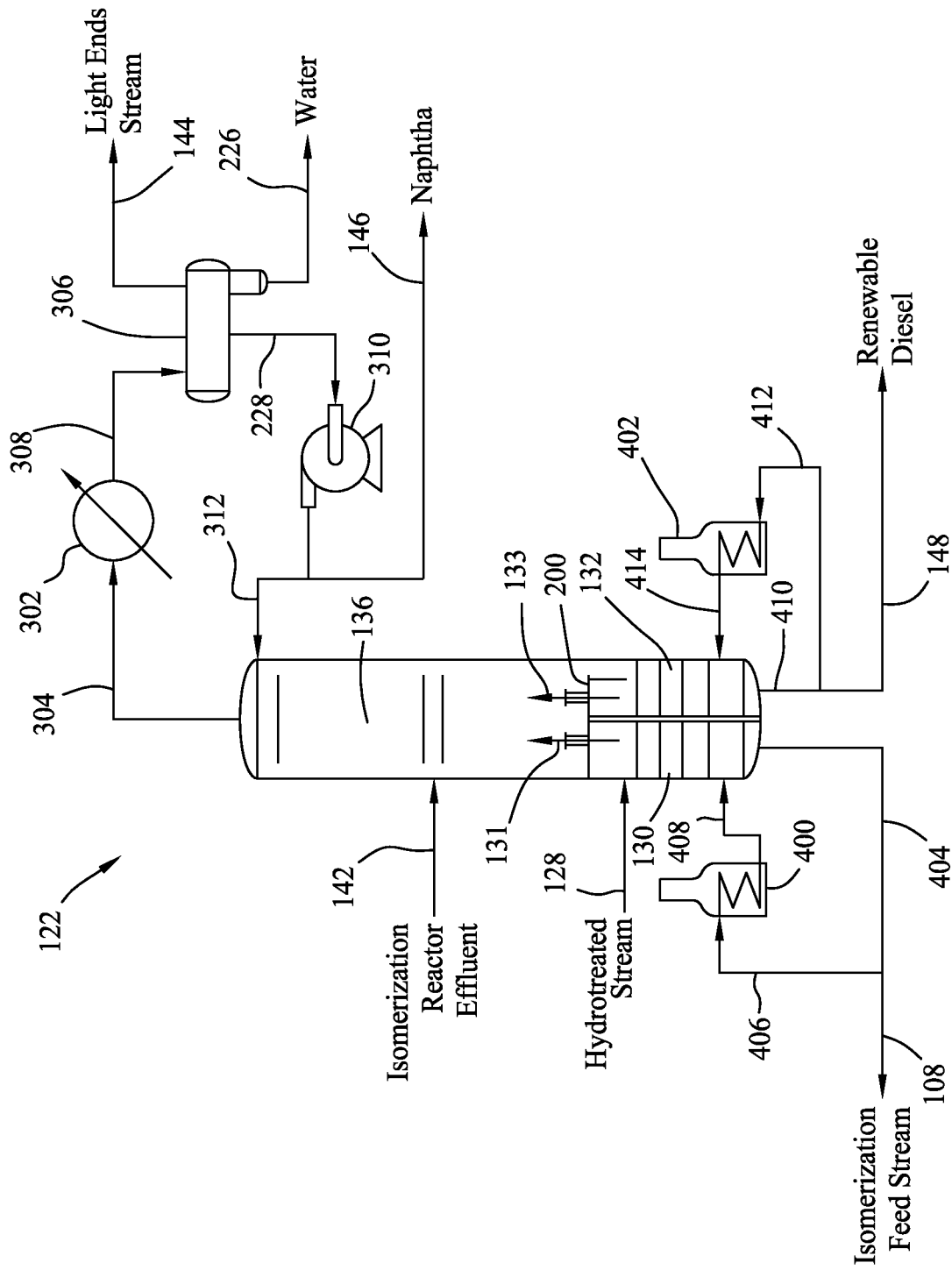
FIG. 4 is a schematic illustration of an integrated stripper in accordance with one or more illustrative embodiments.

FIG. 4 is a schematic illustration of an alternative configuration of the integrated stripper 122 in accordance with one or more embodiments. In FIG. 4, the integrated stripper 122 includes first stripping reboiler 400 and second stripping reboiler 402. The integrated stripper 122 uses heat from the first and second stripping reboilers 400, 402 for separation instead of separate stripping gases.

In operation, example embodiments include introducing the hydrotreated stream 128 into the first separate volume 130 of the column 123. In accordance with present embodiments, the hydrotreated stream 128 is stripped in the first separate volume 130 by heat from the first stripping reboiler 400 to remove isomerization contaminants and form an isomerization feed stream 108 and a first gas stream 131. Similar levels of the isomerization contaminants can be stripped from the hydrotreated stream 128 as described previously. In some embodiments, the first gas stream 131 passes through tray 200 to the common volume 136. In the illustrated embodiment, a first bottoms stream 404 is withdrawn from the first separate volume 130. In some embodiments, the pressure of the first bottoms stream 404 is increased using a pump (not shown). In the illustrated embodiment, a portion of the first bottoms stream 404 is recovered as the isomerization feed stream 108 and passed to the isomerization stage 106 (e.g., shown on FIG. 1). Example embodiments include passing another portion of the first bottoms stream 404 to the first stripping reboiler 400 as first reboiler feed stream 406. In some embodiments, the pressure of the first reboiler feed stream 406 is increased using a pump (not shown). From the first stripping reboiler 400, example embodiments include passing a first reboiler return stream 408 back to the first separate volume 130 where it contacts the hydrotreated stream 128, for example, in a countercurrent manner.

In the illustrated embodiment, the isomerization reactor effluent 142 is introduced into the common volume 136 of the column 123. In some embodiments, the common volume, the isomerization reactor effluent 142 and the first gas stream 131 from the first separate volume 130 is contacted in a countercurrent manner. This results in absorption of hydrocarbons (e.g., C4+ hydrocarbons) from the first gas stream 131 into the isomerization reactor effluent 142. In the illustrated embodiment, the isomerization reactor effluent 142 from the common volume 136 with the absorbed C4+ hydrocarbons are passed to the second separate volume 132 of the column 123, for example, where it is stripped in the second separate volume 132 by heat from the second stripping reboiler 402 to strip lighter components and form the second gas stream 133 and the product stream 148 including renewable diesel. Similar levels of lighter components can be stripped from the isomerization reactor effluent 142 as described previously. In some embodiments, the second gas stream 133 passes through tray 200 to the common volume 136. In the illustrated embodiment, a second bottoms stream 410 is withdrawn from the second separate volume 132. In the illustrated embodiment, a portion of the second bottoms stream 410 is recovered as the product stream 148 including renewable diesel. Example embodiments include passing another portion of the second bottoms stream 410 to the second stripping reboiler 402 as second reboiler feed stream 412. In some embodiments, the pressure of the second reboiler feed stream 412 is increased using a pump (not shown). From the second stripping reboiler 402, in some embodiments, a second reboiler return stream 414 is passed back to the second separate volume 132 where it contacts the isomerization reactor effluent 142, for example, in a countercurrent manner.

In the illustrated embodiment, an overhead gas stream 304 is withdrawn from the column 123 and passed to the external condenser 302 of the reflux system 300. The external condenser 302 cools and at least partially condenses the overhead gas stream 304. In some embodiments, the cooled overhead gas stream 304 is passed to the reflux drum 306. The reflux drum 306 functions, for example, as gas-liquid separator to separate lighter hydrocarbons and other gases from water and heavier hydrocarbons in the cooled overhead gas stream 304. From the reflux drum 306, example embodiments include withdrawing a light ends stream 144 and produced water stream 226. In some embodiments, the remainder liquid in the reflux drum 306 is a hydrocarbon liquid that is pressurized by reflux pump 310 and returned to the column as liquefied hydrocarbon reflux 312. In accordance with example embodiments, a portion of the liquefied hydrocarbon reflux 312 is recovered as naphtha product stream 146.

Figure 5:
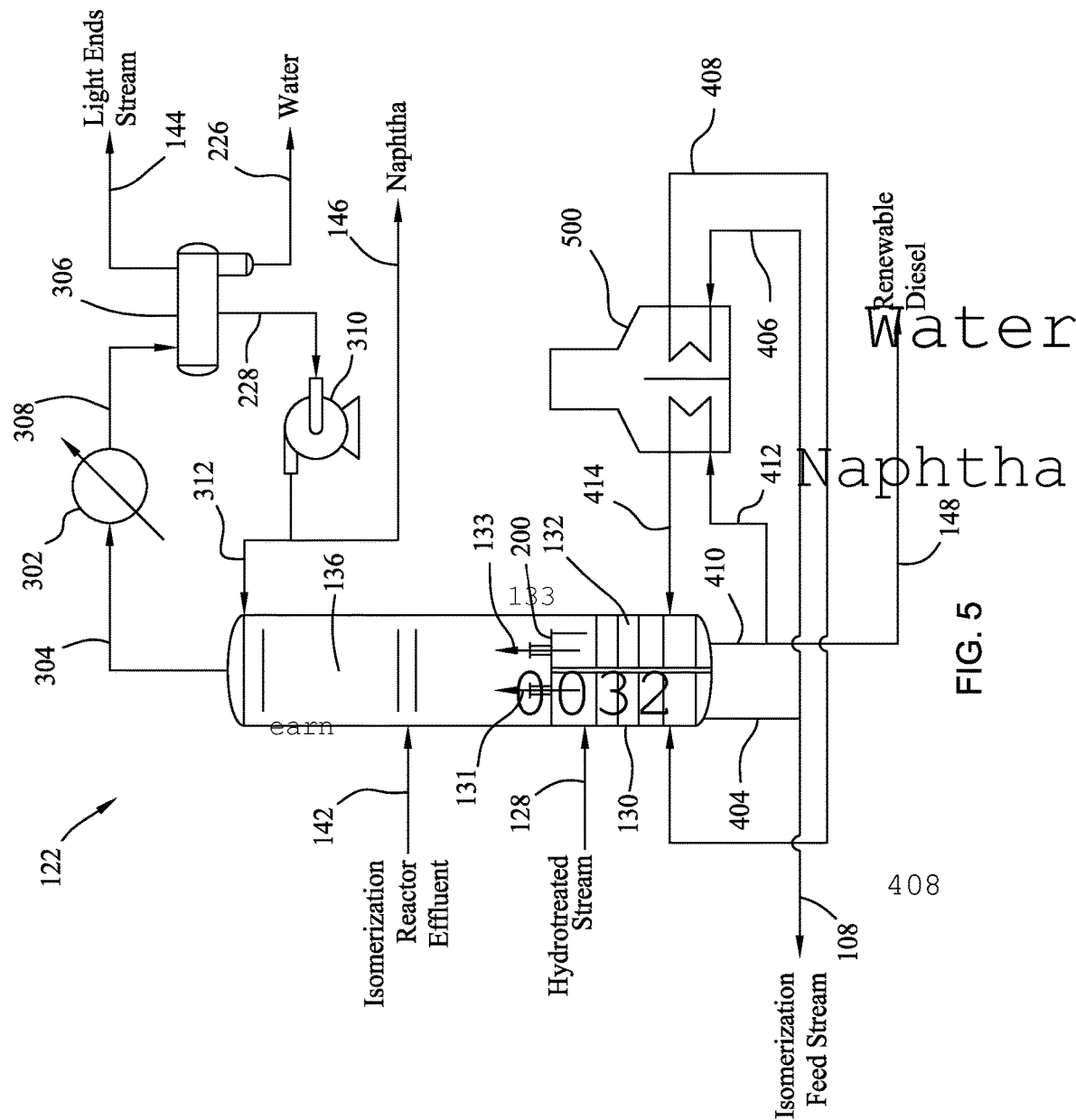
FIG. 5 is a schematic illustration of an integrated stripper in accordance with one or more illustrative embodiments.

FIG. 5 is a schematic illustration of an integrated stripper column in accordance with one or more embodiments. In FIG. 5. the integrated stripper 122 includes a common reboiler 500. The integrated stripper 122 uses heat from the common reboiler 500 for separation instead of separate stripping gases.

In operation, example embodiments include introducing the hydrotreated stream 128 into the first separate volume 130 of the column 123. In some embodiments, the hydrotreated stream 128 is stripped in the first separate volume 130 by heat from the common reboiler 500 to remove isomerization contaminants and form an isomerization feed stream 108 and a first gas stream 131. Similar levels of the isomerization contaminants can be stripped from the hydrotreated stream 128 as described previously. In some embodiments, the first gas stream 131 passes through tray 200 to the common volume 136. In the illustrated embodiment, a first bottoms stream 404 is withdrawn from the first separate volume 130. In some embodiments, a portion of the first bottoms stream 404 is recovered as the isomerization feed stream 108 and passed to the isomerization stage 106 (e.g., shown on FIG. 1). Example embodiments include passing another portion of the first bottoms stream 404 to the common reboiler 500 as first reboiler feed stream 406. In some embodiments, the pressure of the first reboiler feed stream 406 is increased using a pump (not shown). From the common reboiler 500, in some embodiments, a first reboiler return stream 408 is passed back to the first separate volume 130 where it contacts the hydrotreated stream 128, for example, in a countercurrent manner.

In the illustrated embodiment, the isomerization reactor effluent 142 is introduced into the common volume 136 of the column 123. In the common volume, in some embodiments, the isomerization reactor effluent 142 and the first gas stream 131 from the first separate volume 130 are contacted, for example, in a countercurrent manner. This results in absorption of hydrocarbons (e.g., C4+ hydrocarbons) from the first gas stream 131 into the isomerization reactor effluent 142. Example embodiments include passing the isomerization reactor effluent 142 from the common volume 136 with the absorbed C4+ hydrocarbons to the second separate volume 132 of the column 123 where it is stripped in the second separate volume 132 by heat from the common reboiler 500 to strip lighter components and form the second gas stream 133 and the product stream 148 including renewable diesel Similar levels of lighter components can be stripped from the isomerization reactor effluent 142 as described previously. In some embodiments, the second gas stream 133 passes through tray 200 to the common volume 136. Example embodiments include withdrawing a second bottoms stream 410 from the second separate volume 132. In some embodiments, a portion of the second bottoms stream 410 is recovered as the product stream 148 including renewable diesel. Example embodiments include passing another portion of the second bottoms stream 410 to the common reboiler 500 as second reboiler feed stream 412. In some embodiments, the pressure of the second reboiler feed stream 412 is increased using a pump (not shown). From the common reboiler 500, in some embodiments, a second reboiler return stream 414 is passed back to the second separate volume 132 where it contacts the isomerization reactor effluent 142, for example, in a countercurrent manner. The common reboiler may include of two or more cells to provide the heat required for the integrated stripper 122 to achieve the specification required for the isomerization reactor feed stream 108 and final renewable diesel product stream 148.

In the illustrated embodiment, an overhead gas stream 304 is withdrawn from the column 123 and passed to the external condenser 302 of the reflux system 300. The external condenser 302 cools and at least partially condenses the overhead gas stream 304. In some embodiments, the cooled overhead gas stream 304 is passed to the reflux drum 306. The reflux drum 306 functions, for example, as gas-liquid separator to separate lighter hydrocarbons and other gases from water and heavier hydrocarbons in the cooled overhead gas stream 304. From the reflux drum 306, in some embodiments, a light ends stream 144 and produced water stream 226 are withdrawn. In some embodiments, the remainder liquid in the reflux drum 306 is a hydrocarbon liquid, for example, that is pressurized by reflux pump 310 and returned to the column as liquefied hydrocarbon reflux 312. Example embodiments include recovering a portion of the liquefied hydrocarbon reflux 312 as naphtha product stream 146.

FIGS. 2-5 illustrate various stripping schemes for the column 123. FIGS. 2 and 3 use first stripping medium 212 and second stripping medium 230. FIG. 4 uses first stripping reboiler 400 and second stripping reboiler 402. FIG. 5 uses common reboiler 500. In some embodiments, a reboiler is combined with a stripping medium. While not shown, in some embodiments, the first stripping reboiler 400 is used for stripping in the first separate volume 130 while the second stripping medium 230 is used for stripping in the second separate volume 132. While not shown, in further embodiments, the second stripping reboiler 402 is used for stripping in the second separate volume 132 while the first stripping medium 212 is used for stripping in the first separate volume 130. In other embodiments, any combination of the stripping and condensing configurations illustrated in FIG. 2-5 may be used.

Figure 6:
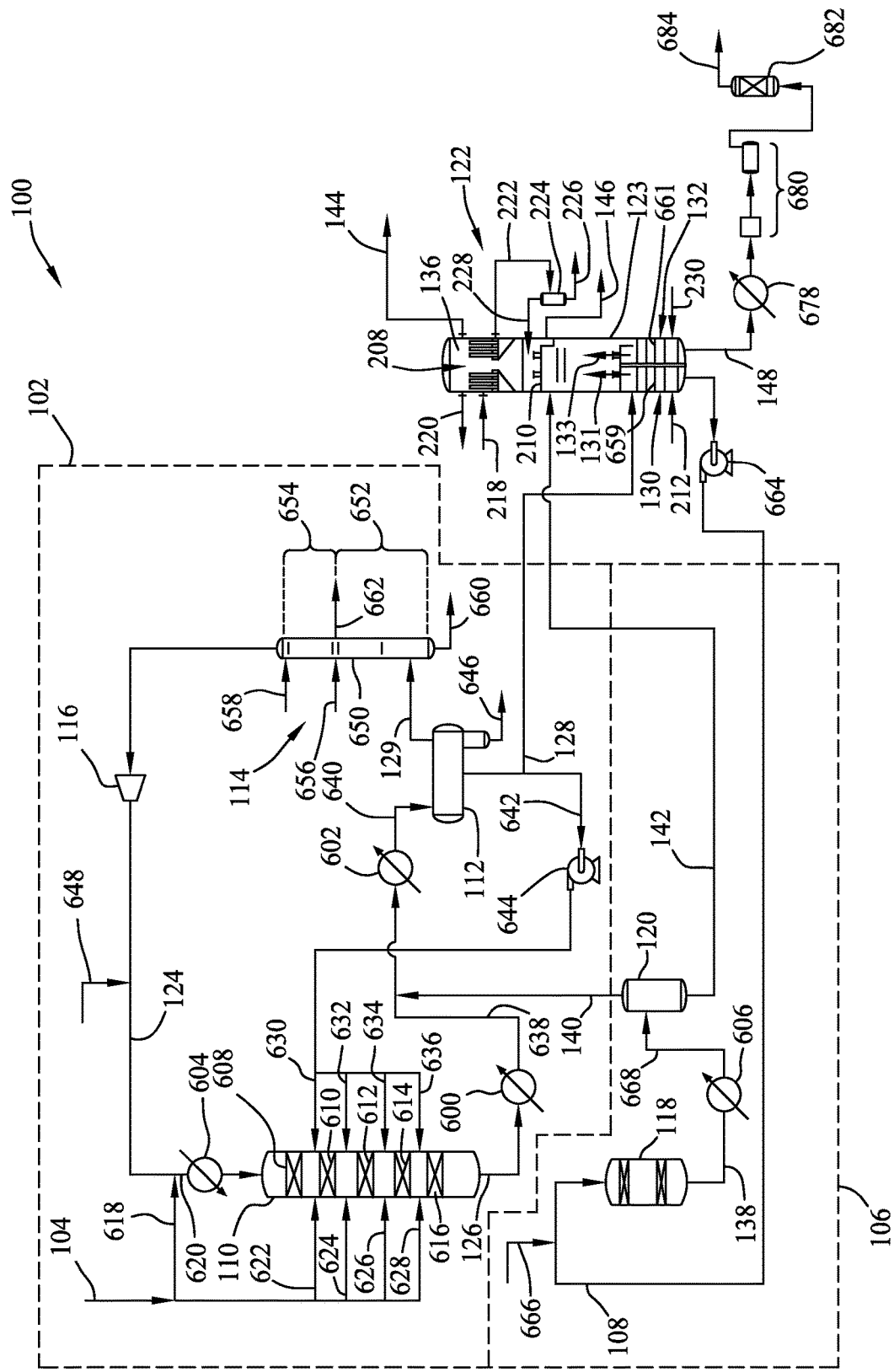
FIG. 6 is a schematic illustration of an integrated stripper in accordance with one or more illustrative embodiments.

FIG. 6 is a schematic illustration of an alternative configuration of the system 100 in accordance with one or more embodiments. In the illustrated embodiment, the system 100 includes the following stages: (i) an HDO stage 102 in which a feed stream 104 containing a biofeedstock is reacted with hydrogen to reduce oxygen in the biofeedstock; and (ii) an isomerization stage 106 that receives an isomerization feed stream 108 containing hydrocarbons from the HDO stage 102 and isomerizes the hydrocarbons to improve the cold flow properties of a distillate boiling range portion of the hydrocarbons. In the illustrated embodiment, the HDO stage 102 includes an HDO reactor 110, an HDO separator 112, amine unit 114, and a hydrogen recycle compressor 116. In accordance with example embodiments, the HDO stage 102 also includes a number of heat exchangers, including, but not limited, first HDO effluent heat exchanger 600, second HDO effluent heat exchanger 602, and hydrogen heat exchanger 604. In accordance with example embodiments, the isomerization stage 106 includes an isomerization reactor 118 and an isomerization reactor effluent separator 120. In some embodiments, the isomerization stage 106 also includes an isomerization effluent heat exchanger 606. In the illustrated embodiment, the system 100 includes an integrated stripper 122 for an integrated scheme for the HDO stage 102 and the isomerization stage 106. While not shown, in some embodiments, the system 100 includes further heat integration. Those of ordinary skill in the art, with the benefit of this disclosure, should be able to develop optimized heat exchanger network schemes that optimize the external heating and cooling for the system 100.

In FIG. 6, the HDO reactor 110 includes a first catalyst bed 608, second catalyst bed 610, third catalyst bed 612, fourth catalyst bed 614, and fifth catalyst bed 616. While FIG. 6, illustrates the HDO reactor 110 as including five catalyst beds, it should be understood that the HDO reactor 110 may have more or less than five catalyst beds in accordance with present embodiments. In the illustrated embodiment, portions of feed stream 104 can be delivered to various regions of the HDO reactor. For example, the feed stream 104 may be divided into 2, 3, 4, 5, or more portions with each portion introduced into the HDO reactor 110 between different sets of catalyst beds. For example, a first portion 618 can be delivered into the HDO reactor above the first catalyst bed 608. In the illustrated embodiment, the first portion 618 is combined with the hydrogen treat gas stream 124 with the combined feed stream 620 passed through hydrogen heat exchanger 604 for heating followed by introduction into the HDO reactor 110 above the first catalyst bed 608. In another embodiment (not shown), the hydrogen treat gas stream 124 passes through hydrogen heat exchanger 604 for heating followed mixing it with the first portion 618 and then introducing the mixed stream into the HDO reactor 110 above the first catalyst bed 608. In some embodiments, a second portion 622 of the feed stream 104 is delivered into the HDO reactor between the first and second catalyst beds 608, 610. In some embodiments, a third portion 624 of the feed stream 104 is delivered into the HDO reactor between the second and third catalyst beds 610, 612. In some embodiments, a fourth portion 626 of the feed stream 104 is delivered into the HDO reactor between the third and fourth catalyst beds 612, 614. In some embodiments, a fifth portion 628 of the feed stream 104 is delivered into the HDO reactor between the fourth and fifth catalyst beds 614, 616. Any suitable amount of the feed stream 104 can be delivered into the various locations of the HDO reactor with the optional constraint that from 1.0 vol % to 30 vol % of the total fresh feed from the feed stream 104 is introduced above the first catalyst bed 608 with a remainder of the fresh feed being introduced downstream. In alternative embodiments, 5.0 wt % to 20 wt %, or 10 wt % to 30 wt %, or 10 wt % to 25 wt % of the total fresh feed is introduced above the first catalyst bed 608 with a remainder of the fresh feed being introduced downstream. In some embodiments, the volume percentage of fresh feed (relative to the total fresh feed) increases for each downstream region. By exposing only a minor portion of the total fresh feed to the first catalyst bed 608, the temperature rise across the first catalyst bed 608 can be managed to a target level. The resulting deoxygenated effluent from the first catalyst bed 608 can then be at least partially passed into the second catalyst bed 610 (or other subsequent catalyst bed), along with additional fresh feed. The deoxygenated effluent from the first catalyst bed 608 serves, for example, as an additional diluent and/or heat transfer fluid in subsequent catalyst beds for performing deoxygenation. Additionally, one or more techniques can be used to further assist with managing the temperature in subsequent catalyst beds, such as using additional hydrogen treat gas as a quench gas between catalyst beds, using heat exchangers to further cool the deoxygenated effluent, and/or using recycle streams. In some embodiments, while not shown, the HDO reactor 110 includes additional beds that do not include fresh feed but could have quench stream or no quench stream. The quench stream could be, for example, from a liquid recycle stream or hydrogen quench.

In some embodiments, the biofeedstock from the feed stream 104 is exposed to hydrodeoxygenation conditions in the HDO reactor 110 in the presence of the catalyst beds that contain hydrodeoxygenation catalyst such that the biofeedstock reacts with the hydrogen to reduce oxygen in the biofeedstock. The reaction in the HDO reactor 110 produces hydrotreated biofeedstock, including paraffins, reaction intermediates (if any), and unreacted biofeedstock (if any) and hydrogen. The paraffins include, for example, long chain paraffinic molecules, such as molecules ranging from 10 carbons long to 24 carbons long or from 10 carbons long to 19 carbons long or from 15 carbons long to 19 carbons long along with light ends having 9 or fewer carbons. In some embodiments, the hydrodeoxygenation substantially deoxygenates the biofeedstock. This corresponds to removing 90% or more, for example, 95% or more, 98% or more, 99% or more, 99.5% or more, 99.9% or more, or completely (measurably) all the oxygen present in the biofeedstock. Alternately, substantially deoxygenating the biofeedstock corresponds to reducing the oxygenate level of the hydrotreated biofeedstock to 0.1 wt. % or less, for example, 0.05 wt. % or less, 0.03 wt. % or less, 0.02 wt. % or less, 0.01 wt. % or less, 0.005 wt. % or less, 0.003 wt. % or less, 0.002 wt. % or less, or 0.001 wt. % or less.

During operation of a reactor performing hydrodeoxygenation, the temperature across a catalyst bed can increase. While the distribution of the feed stream 104 shown in FIG. 6 can mitigate this temperature increase, it can also be beneficial to reduce the temperature of the effluent from one catalyst bed prior to introducing that effluent into the next catalyst bed. To assist with temperature management, the configuration shown in FIG. 6 provides recycle streams of hydroxygenated effluent as quench streams for various reactor regions. Using product recycle from HDO stage (from the low temperature high pressure separator or the isomerization reactor feed) or the final product to provide cooling of effluent between catalyst beds can provide various advantages. For example, using product recycle can reduce or minimize hydrogen circulation relative to aspects where a hydrogen quench gas is used for cooling between catalyst beds. In some embodiments, heat exchangers are used to remove the heat of reaction between catalyst beds, for example, between first and second catalyst beds 608, 610, between second and third catalysts beds 610, 612, and between third and fourth catalyst beds 612, 614.

In the illustrated embodiment, multiple recycle streams are used as quench streams between different sets of catalyst beds. For example, first recycle stream 630 is used as a quench flow between the first catalyst bed 608 and the second catalyst bed 610. Second recycle stream 632 is used as a quench flow between the second catalyst bed 610 and the third catalyst bed 612. Third recycle stream 634 is used as a quench flow between the third catalyst bed 612 and the fourth catalyst bed 614. Fourth recycle stream 636 is used as a quench flow between the fourth catalyst bed 614 and the fifth catalyst bed 616. Optionally, any convenient number of recycle streams can be used that are introduced into any convenient combination of the regions.

In the illustrated embodiment, a hydrotreated effluent stream 126 including hydrotreated biofeedstock is withdrawn from the HDO reactor 110 and flowed to the first HDO effluent heat exchanger 600 for cooling. Example embodiments include combining a cooled hydrotreated effluent stream 638 with a gas stream 140 from the isomerization stage 106 and then passing this combined stream to the second HDO effluent heat exchanger 602 for additional cooling. In the illustrated embodiment, the mixed HDO effluent stream 640 is then be passed to the HDO separator 112, where a gas-phase portion is separated from liquid-phase products. In the illustrated embodiment, the HDO separator 112 produces a hydrotreated stream 128 including liquid hydrocarbons (e.g., paraffins). In some embodiments, the gas-phase stream 129 contains hydrogen, for example, that can be recycled to the HDO reactor 110. A portion of the hydrotreated stream 128 can be recycled as effluent recycle stream 642 and split to form the various quench streams after pressurizing in HDO recycle pump 644. As illustrated, example embodiments include withdrawing a water stream 646 from the HDO separator 112.

In the illustrated embodiment, the gas-phase stream 129 is passed to an amine unit 114. In some embodiments, the gas-phase stream 129 contains lighter contaminants from the hydrotreated effluent stream 126, including, but not limited to, carbon monoxide, carbon dioxide, hydrogen sulfide, water (e.g., equilibrium water), and ammonia, as well as some hydrocarbons having 6 carbons or less. In the amine unit 114, for example, hydrogen sulfide is incorporated into the gas-phase stream 129 to provide a hydrogen treat gas stream 124 that contains hydrogen and hydrogen sulfide. In some embodiments, the amine unit 114 also removes contaminant gases from the gas-phase stream 129, such as ammonia, carbon monoxide, and carbon dioxide, that were generated in the HDO reactor 110. In some embodiments, the hydrogen treat gas stream 124 from the amine unit 114 is compressed by hydrogen recycle compressor 116 and then recycled to the HDO reactor 110. If needed, example embodiments include adding make-up hydrogen gas 648 to the hydrogen treat gas stream 124 (or directly to the HDO reactor 110). By incorporation of hydrogen sulfide into the hydrogen treat gas stream 124, the hydrogen treat gas stream 124 should contain sufficient hydrogen sulfide to substantially maintain the catalysts in the HDO reactor 110 in a sulfided state.

In the illustrated embodiment, the amine unit 114 includes a vessel 650 including an amine adsorber section 652 and an amine stripper section 654. While FIG. 6 illustrates one of the vessel 650, it should be understood that the amine unit 114 can be configured with multiple vessels, for example, with the amine adsorber section 652 and amine stripper section 654 in separate vessels. In the illustrated embodiment, the gas-phase stream 129 is introduced into the amine adsorber section 652 along with a lean amine stream 656 (e.g., 0.1 vol % or less of hydrogen sulfide). In the amine adsorber section 652, in some embodiments, the gas-phase stream 129 contacts the lean amine stream 656, for example, in a counter current manner, thus allowing for adsorption of one or more contaminants (e.g., carbon dioxide, hydrogen sulfide, etc.) from the gas-phase stream 129 into the lean amine stream 656. As the gas-phase stream 129 travels up the vessel 650 into amine stripper section 654, it should contact a rich amine stream 658 (e.g., molar ratio of hydrogen sulfide to amine of 0.25 or more, 0.30 or more, such as up to 1.0). In the illustrated embodiment, the rich amine stream 658 (the feed temperature can be determined based on optimization) is introduced into the vessel 650 above the lean amine stream 656. As illustrated, example embodiments include introducing the rich amine stream 658 into the amine stripper section 654, such that it contacts the gas-phase stream 129 in the amine stripper section 654, for example, in a counter current manner, where hydrogen sulfide is transferred to the gas-phase stream 129. This results in a hydrogen treat gas stream 124 withdrawn as an overhead from the vessel 650 that is enriched in hydrogen sulfide. In some embodiments, a rich amine bottoms stream 660 and a purge stream 662 are be withdrawn from the vessel 650. The purge stream 662 functions, for example, to control hydrogen purity and carbon monoxide concentration in the hydrogen treat gas stream 124 recycled to the HDO reactor 110. While not illustrated, an optional water wash can be used in the vessel 650, for example, above the rich amine stream 658 to reduce or minimize the potential for entrained amine in the hydrogen treat gas stream 124. After addition of the hydrogen sulfide, the resulting hydrogen treat gas stream 124 containing both hydrogen and $H_2S$ includes, for example, 5 ppmv to 3.0 vol % of $H_2S$, or 0.05 vol % to 1.0 vol %, or 0.05 vol % to 0.3 vol %, or 0.1 vol % to 3.0 vol %, or 0.1 vol % to 1.0 vol %. In such embodiments, the hydrogen content of the hydrogen treat gas stream 124 can be 75 vol % or more, or 80 vol % or more, or 85 vol % or more, or 90 vol % or more, such as up to 99.95 vol %.

In addition to the gas-phase stream 129 being withdrawn from the HDO separator 112 and passed to the amine unit 114, example embodiments also include withdrawing a hydrotreated stream 128 including hydrocarbons from the HDO separator 112 as illustrated on FIG. 6. In some embodiments, he hydrotreated stream 128 is passed to the integrated stripper 122. The integrated stripper includes, for example, a vessel 123 including a first separate volume 130, a second separate volume 132, and a common volume 136. Example embodiments include introducing the hydrotreated stream 128 into the first separate volume 130 where it contacts (e.g., countercurrently) a first stripping medium 212 to remove isomerization contaminants (e.g., carbon monoxide, carbon dioxide, and water) from the hydrotreated stream 128 and form an isomerization feed stream 108 and a first gas stream 131. In some embodiments, the hydrotreated stream 128 and the first stripping medium 212 countercurrently contact across a first tray section 659 (or a first packed section 204 as shown on FIG. 2) in the first separate volume 130. Similar levels of contaminants can be removed from the hydrotreated stream 128 as previously described.

In some embodiments, the isomerization feed stream 108 including the stripped hydrocarbons is pressurized by isomerization feed pump 664 and then passed to the isomerization reactor 118 after heating. Example embodiments include adding make-up hydrogen 666 to the isomerization feed stream 108 prior to introduction into the isomerization reactor 118. In the isomerization reactor, catalytic isomerization is performed by exposing the stripped hydrocarbons in the isomerization feed stream 108 to an isomerization catalyst under effective isomerization conditions. Example embodiments include withdrawing an isomerization reactor product stream 138 from the isomerization reactor 118 and cooling the isomerization reactor product stream 138 in isomerization effluent heat exchanger 606. In some embodiments, the cooled isomerization product stream 668 is then be passed to the isomerization reactor effluent separator 120. In the isomerization reactor effluent separator 120, in some embodiments, the liquid-phase products in the cooled isomerization product stream 668 is separated from the gas-phase products to form a gas stream 140 and an isomerization reactor effluent 142. In the illustrated embodiment, the gas stream 140 including, for example, hydrogen and lighter hydrocarbons (e.g., C1-C10 hydrocarbons), dependent on the operating conditions of the isomerization reactor effluent separator 120, are combined with the cooled hydrotreated effluent stream 638.

In the illustrated embodiment, the isomerization reactor effluent 142 is then be passed to the integrated stripper 122. In FIG. 6, in some embodiments, the isomerization reactor effluent 142 from the isomerization stage 106 enters the common volume 136 of the vessel 123 where it contacts the first gas stream 131 from the first separate volume 130. The isomerization reactor effluent 142 absorbs hydrocarbons (e.g., C4+ hydrocarbons) from the first gas stream 131. In the illustrated embodiment, the common volume 136 also receives a second gas stream 133 from the second separate volume 132. In some embodiments, vapor in the common volume 136 flows upward through tray 210 into the condenser 208. In some embodiments, a coolant is introduced into the condenser 208, shown as inlet cooling water stream 218 and outlet cooling water stream 220. From the condenser 208, example embodiments include withdrawing a light ends stream 144, a water-hydrocarbon mixture 222, and a naphtha product stream 146. In some embodiments, the water-hydrocarbon mixture 220 is passed to a separator 224 to produce a water stream 226 and a hydrocarbon stream 228. Example embodiments include returning the hydrocarbon stream 228 to the column 123.

In the illustrated embodiment, the isomerization reactor effluent 142 from the common volume 136 with the absorbed hydrocarbons (e.g., C4+ hydrocarbons) is passed to the second separate volume 132 of the column 123. In some embodiments, a second stripping medium 230 is also introduced into the second separate volume 132. In some embodiments, the isomerization reactor effluent 142 is stripped by the second stripping medium 230 to remove lighter components, such as hydrocarbons having less than 10 carbons. For example, in some embodiments, the isomerization reactor effluent 142 and the second stripping medium 230 are contacted in a countercurrent manner across the second tray section 661 (or packing, such as second packing section 206 on FIG. 2). This results in formation of at least a second gas stream 133 and a product stream 148. Example embodiments include passing the second gas stream 133 to the common volume 136, while the product stream 148 may be withdrawn from the column 123. In some embodiments, the product stream 148 includes renewable diesel. In the illustrated embodiment, the product stream 148 is further treated, for example, the product stream 148 may be processed through various equipment. In some embodiments, the product stream 148 is cooled in heat exchanger 678 then passed through filter-coalescer 680 and then a salt dryer 682 to provide a treated product stream 684 if the second stripping medium 230 is steam, for example, to meet the water specification of the final product.

Feedstocks

In accordance with present embodiments, the renewable diesel is produced from a biofeedstock. As used herein, a biofeedstock refers to a feed derived from a biological source, which is a feed derived from a biological raw material component, such as vegetable fats/oils or animal fats/oils, fish oils, pyrolysis oils, and algae lipids/oils, as well as components of such materials, and in some embodiments can specifically include one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Examples of vegetable oils that can be used in accordance with this invention include, but are not limited to, rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

As an example, in some embodiments, renewable diesel production can correspond to conversion of a biofeedstock including a substantial portion of vegetable oil into renewable diesel. Such a biofeedstock can include 40 wt % or more of a bio-oil, or 60 wt % or more, or 80 wt % or more, such as up to being substantially composed of a bio-oil (99 wt % or more). Some types of bio-oil can correspond to soybean oil, canola oil, and/or other types of oils corresponding to a primary bio-oil product. In such aspects, the bio-oil can optionally have a triglyceride content of 40 wt % or more, or 60 wt % or more, or 80 wt % or more, such as up to being substantially composed of triglycerides. Other types of bio-oils can correspond to oils such as the corn oil that is formed as a secondary product during ethanol production from corn biomass.

Algae oils or lipids can typically be contained in algae in the form of membrane components, storage products, and/or metabolites. Certain algal strains, particularly microalgae such as diatoms and cyanobacteria, can contain proportionally high levels of lipids. Algal sources for the algae oils can contain varying amounts, e.g., from 2 wt % to 40 wt % of lipids, based on total weight of the biomass itself.

Vegetable fats/oils, animal fats/oils, fish oils, pyrolysis oils, and/or algae lipids/oils as referred to herein can also include processed material. Non-limiting examples of processed vegetable, animal (including fish), and algae material include fatty acids and fatty acid alkyl esters. Alkyl esters typically include $C_1$-$C_5$ alkyl esters of fatty acids. One or more of methyl, ethyl, and propyl esters are preferred.

Other bio-derived feeds usable in the present invention can include any of those which include primarily triglycerides and free fatty acids (FFAs). The triglycerides and FFAs typically contain aliphatic hydrocarbon chains in their structure having from 8 to 36 carbons, preferably from 10 to 26 carbons, for example from 10 to 22 carbons or 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be included of $C_{10}$ to $C_{26}$ fatty acid constituents, based on total triglyceride present in the lipid material. Further, a triglyceride is a molecule having a structure corresponding to a reaction product of glycerol and three fatty acids. Although a triglyceride is described herein as having side chains corresponding to fatty acids, it should be understood that the fatty acid component does not necessarily contain a carboxylic acid hydrogen. Other types of feed that are derived from biological raw material components can include fatty acid esters, such as fatty acid alkyl esters (e.g., FAME and/or FAEE).

A feed derived from a biological source can have a wide range of nitrogen and/or sulfur contents. For example, a feedstock based on a vegetable oil source can contain up to 300 wppm nitrogen. In contrast, a biomass based feed stream containing whole or ruptured algae can sometimes include a higher nitrogen content. Depending on the type of algae, the nitrogen content of an algae based feed stream can be at least 2 wt %, for example at least 3 wt %, at least 5 wt %, such as up to 10 wt % or possibly still higher. The sulfur content of a feed derived from a biological source can also vary. In some embodiments, the sulfur content can be 500 wppm or less, or 200 wppm or less, or 100 wppm or less, or 50 wppm or less, such as down to being substantially free of sulfur (1.0 wppm or less).

Aside from nitrogen and sulfur, oxygen can be another heteroatom component in feeds derived from a biological source. For example, a feed derived from a biological source, prior to hydrodeoxygenation, can include 1.0 wt % to 15 wt % of oxygen, or 1.0 wt % to 10 wt %, or 3.0 wt % to 15 wt %, or 3.0 wt % to 10 wt %, or 4.0 wt % to 15 wt %, or 4.0 wt % to 12 wt %.

In some embodiments, a portion of a mineral feedstock can be co-processed with a feed derived from a biological source. A mineral feedstock refers to a conventional feedstock, typically derived from crude oil and that has optionally been subjected to one or more separation and/or other refining processes. In one preferred embodiment, the mineral feedstock can be a petroleum feedstock boiling in the diesel range or above. Examples of suitable feedstocks can include, but are not limited to, virgin distillates, hydrotreated virgin distillates, kerosene, diesel boiling range feeds (such as hydrotreated diesel boiling range feeds), light cycle oils, atmospheric gas oils, and the like, and combinations thereof. The amount of mineral feedstock blended with a feed derived from a biological source can correspond to 1.0 wt % to 50 wt % of the weight of the blended feedstock. Alternatively, the amount of feed derived from biological source can correspond to 1.0 wt % to 50 wt % of the weight of the blended feed stock. Additionally or alternately, in some embodiments, the amount of mineral feedstock blended with the bio-derived feed is low enough so that the resulting blended or combined feed has a sulfur content of 10 wppm to 1000 wppm.

Mineral feedstocks for blending with a bio-derived can be relatively free of nitrogen (such as a previously hydrotreated feedstock) or can have a nitrogen content from 1 wppm to 2000 wppm nitrogen, for example from 50 wppm to 1500 wppm or from 75 to 1000 wppm. In some embodiments, the mineral feedstock can have a sulfur content from 1 wppm to 10,000 wppm sulfur, for example from 10 wppm to 5,000 wppm or from 100 wppm to 2,500 wppm. However, in various aspects, such mineral feedstocks can be combined with a bio-derived feed (and/or other feeds) so that the resulting combined feed has a sulfur content of 1000 wppm or less, 300 wppm or less, or 200 wppm or less, or 100 wppm or less, such as down to 0.1 wppm or possibly still lower. Additionally or alternately, the combined feed can have an oxygen content of 1.0 wt % or more, such as 1.0 wt % to 15 wt %.

The content of sulfur, nitrogen, oxygen, and olefins in a feedstock created by blending two or more feedstocks can typically be determined using a weighted average based on the blended feeds. For example, a mineral feed and a bio-derived feed can be blended in a ratio of 20 wt % mineral feed and 80 wt % bio-derived feed. If the mineral feed has a sulfur content of 1000 wppm, and the bio-derived feed has a sulfur content of 10 wppm, the resulting blended feed could be expected to have a sulfur content of 208 wppm.

Hydrodeoxygenation Stage

In various embodiments, a biofeedstock can be exposed to hydroprocessing conditions in a hydroprocessing stage. An HDO stage can include one or more HDO reactors, with each HDO reactor including one or more catalyst beds. The catalyst beds within a reactor can include similar catalysts or different catalysts, depending on the configuration. Exposing a biofeedstock to hydroprocessing conditions can result in hydrodeoxygenation of the feed. In some embodiments, the hydrodeoxygenation includes reacting the biofeedstock with hydrogen to remove oxygen. The reaction in the HDO stage should produce a hydrotreated effluent that includes paraffin products, reaction intermediates, and unreacted biofeedstock and hydrogen. Example reaction intermediates include esters, acids, and ketones, alcohols, among others.

Some examples of HDO catalysts can correspond to hydrotreating catalysts. Examples of suitable HDO catalysts include at least one Group 6 metal and/or Group 8 metal, optionally on a support such as alumina or silica. Specific examples can include, but are not limited to, NiMo, CoMo, and NiW supported catalysts. In some embodiments, a catalyst can be used that includes a Group 6 metal on a support material, but less than 1.0 wt % of a Group 8 metal. In other aspects, a hydrotreating catalysts that include both a Group 6 metal and a Group 8 metal on a support material can be used. At least one Group 6 metal, in oxide form, can typically be present in an amount ranging from 2.0 wt % to 40 wt %, relative to a total weight of the catalyst, or 6.0 wt % to 40 wt %, or 10 wt % to 30 wt %. When a Group 8-10 metal is also present, the at least one Group 8-10 metal, in oxide form, can typically be present in an amount ranging from 2.0 wt % to 40 wt %, preferably for supported catalysts from 2.0 wt % to 20 wt % or from 4.0 wt % to 15 wt %.

The HDO catalyst can be provided in a reactor in one or more catalyst beds. For example, a convenient bed length in some reactors is a bed length of 25 feet to 30 feet. Such a bed length reduces difficulties in a catalyst bed associated with poor flow patterns. Due to the heat release from the initial bed during olefin saturation and deoxygenation, some embodiments use a shorter catalyst bed as the initial bed, such as having a bed length of 10 feet to 25 feet.

The HDO reactor can be operated at any suitable conditions that are effective for hydrodeoxygenation. Effective hydrodeoxygenation conditions include, but are not limited to, a temperature of 230° C. or higher, for example, 285° C. or higher, 315° C. or higher, or 340° C. or higher. Additionally, or alternately, the temperature can be 400° C. or less, for example, 370° C. or less, or 340° C. or less. Suitable effective temperatures can be from 230° C. to 375° C., or 250° C. to 350° C. Effective hydrotreatment conditions can additionally or alternately include, but are not limited to, a total pressure of 2.8 MPag or more, for example, 3 MPag or more, 5 MPag or more, or 7 MPag or more. Additionally or alternately, the total pressure can be 10 MPag or less, for example 8 MPag or less, 7 MPag or less, or 6 MPag or less. In some embodiments, the hydrodeoxygenation conditions can include, but are not necessarily limited to, a temperature of 315° C. to 425° C. and a total pressure of 2 MPag to 21 MPag).

Additional hydrodeoxygenation conditions for the HDO reactor include a hydrogen treat gas rate and a liquid hourly space velocity (LSHV). The LSHV can be from 0.1 hr$^{-1}$ to 10 hr$^1$, or from 0.2 hr$^{-1}$ to 5.0 hr$^{-1}$. The hydrogen treat gas rate can be any convenient value that provides sufficient hydrogen for deoxygenation of a feedstock. Typical values can range from 500 scf/B (84 Nm$^3$/m$^3$) to 10,000 scf/B (1685 Nm$^3$/m$^3$). One option for selecting a treat gas rate can be to select a rate based on the expected stoichiometric amount of hydrogen for complete deoxygenation and olefin saturation of the feedstock. For example, many types of feeds derived from biological sources have a stoichiometric hydrogen need for deoxygenation of between 200 scf/B (34 Nm$^3$/m$^3$) to 5000 scf/B (~850 Nm$^3$/m$^3$). In some embodiments, the hydrogen treat gas rate can be selected based on a multiple of the stoichiometric hydrogen need, such as at least 1 times the hydrogen need, or at least 1.5 times the hydrogen need, or at least 2 times the hydrogen need, such as up to 10 times the hydrogen need or possibly still higher. In other aspects where at least a portion of the gas phase deoxygenation effluent is recycled, any convenient amount of hydrogen relative to the stoichiometric need can be used. In various aspects, the hydrogen treat gas can be an H$_2$S-enriched hydrogen treat gas as described herein with an H$_2$S content of 5 ppmv to 3.0 vol %.

As previously described, the HDO stage should at least partially deoxygenate the biofeedstock. Deoxygenating the biofeedstock can avoid problems with catalyst poisoning or deactivation due to the creation of water or carbon oxides during the subsequent isomerization stage. The HDO stage can be used to substantially deoxygenate the biofeedstock. This corresponds to removing 90% or more, for example, 95% or more, 98% or more, 99% or more, 99.5% or more, 99.9% or more, or completely (measurably) all the oxygen present in the biofeedstock. Alternately, substantially deoxygenating the biofeedstock can correspond to reducing the oxygenate level of the hydrotreated biofeedstock to 0.1 wt. % or less, for example, 0.05 wt. % or less, 0.03 wt. % or less, 0.02 wt. % or less, 0.01 wt. % or less, 0.005 wt. % or less, 0.003 wt. % or less, 0.002 wt. % or less, or 0.001 wt. % or less.

Isomerization Stage

In various embodiments, an isomerization feed stream can be exposed to isomerization conditions in an isomerization stage. The isomerization feed stream can include hydrocarbons from the HDO stage. The isomerization stage can include one or more isomerization reactors, with each isomerization reactor including one or more catalyst beds. The catalyst beds within a reactor can include similar catalysts or different catalysts, depending on the configuration. Exposing an isomerization feed stream to isomerization conditions can result in hydroisomerization of long chain hydrocarbons with improved cold flow properties of the distillate boiling range portion of the effluent. In the isomerization stage, long chain hydrocarbons can also be hydrocracked. Fatty acid carbon chains often correspond to unbranched carbon chains. After deoxygenation, such unbranched carbon chains can often have relatively poor cold flow properties, such as relatively high pour points, cloud points, or cold filter plugging points. In production of renewable diesel, it can be desirable to expose a distillate boiling range product to an isomerization catalyst under isomerization conditions in order to improve the cold flow properties Isomerization catalysts can include molecular sieves such as crystalline aluminosilicates (zeolites). More generally, isomerization catalysts can correspond to catalysts having a zeotype framework. The isomerization catalyst can optionally be a supported catalyst, such as a catalyst including a zeotype framework and a binder material. In an embodiment, the zeotype framework can include, consist essentially of, or be ZSM-5, ZSM-22, ZSM-23, ZSM-35, ZSM-48, zeolite Beta, or a combination thereof, for example ZSM-23 and/or ZSM-48, or ZSM-48 and/or zeolite Beta. Optionally but preferably, zeotype frameworks that are selective for isomerization by isomerization as opposed to cracking can be used, such as ZSM-48, zeolite Beta, ZSM-23, or a combination thereof. Additionally or alternately, the zeotype framework can include, consist essentially of, or be a 10-member ring 1-D zeotype framework. Optionally but preferably, the isomerization catalyst can include a binder for the zeotype framework, such as alumina, titania, silica, silica-alumina, zirconia, or a combination thereof, for example alumina and/or titania or silica and/or zirconia and/or titania.

Aside from the zeotype framework(s) and optional binder, the isomerization catalyst can also include at least one metal hydrogenation component, such as a Group 8-10 metal. Suitable Group 8-10 metals can include, but are not limited to, Pt, Pd, Ni, or a combination thereof. When a metal hydrogenation component is present, the isomerization catalyst can include 0.1 wt % to 10 wt % of the Group 8-10 metal, or 0.1 wt % to 5.0 wt %, or 0.5 wt % to 10 wt %, or 0.5 wt % to 5.0 wt %, or 1.0 wt % to 10 wt %, or 1.0 wt % to 5.0 wt %.

In some embodiments, the isomerization catalyst can include an additional Group 6 metal hydrogenation component, such as W and/or Mo. In such aspects, when a Group 6 metal is present, the isomerization catalyst can include 0.5 wt % to 20 wt % of the Group 6 metal, or 0.5 wt % to 10 wt %, or 2.5 wt % to 20 wt %, or 2.5 wt % to 10 wt %. As one example, the isomerization catalyst can include 0.1 wt % to 5.0 wt % Pt and/or Pd as the hydrogenation metal component. As another example, the isomerization catalyst can include as the hydrogenation metal components Ni and W, Ni and Mo, or Ni and a combination of W and Mo.

Catalytic isomerization can be performed by exposing the isomerization feed stream to an isomerization catalyst under effective (catalytic) isomerization conditions. Effective isomerization conditions can include, but are not limited to, a temperature of 260° C. or higher, for example, 285° C. or higher, 315° C. or higher, or 340° C. or higher. Additionally, or alternately, the temperature can be 450° C. or less, for example 370° C. or less, or 345° C. or less. Effective isomerization conditions can additionally or alternately include, but are not limited to, a total pressure of 1.4 MPag or more, for example, 1.7 Mpag or more, 3.4 MPag or more, 5.2 MPag or more, or 6.9 MPag or more. Additionally or alternately, the total pressure can be 35 MPag or less, for example 10 MPag or less. In some embodiments, isomerization conditions include a temperature of 260° C. to 450° C. and a pressure of 1.4 Mpag to 35 Mpag. The liquid hourly space velocity (LHSV) of the feed relative to the isomerization catalyst can be characterized can be from 0.1 $hr^{-1}$ to 10 $hr^{-1}$.

Additional Embodiments

Accordingly, the preceding description describes production of renewable diesel and, more particularly, to use of an integrated stripper for product separation. The methods, systems, and apparatus disclosed herein may include any of the various features disclosed herein, including one or more of the following embodiments.

Embodiment 1. A method of processing a biofeedstock, including: hydrotreating the biofeedstock by reaction with hydrogen in the presence of a hydrodeoxygenation catalyst to form at least a hydrotreated effluent stream; cooling the hydrotreated effluent stream; separating a gas-phase portion from at least the cooled hydrotreated effluent stream to form at least a gas-phase stream and a hydrotreated stream; stripping at least a portion of the hydrotreated stream to remove isomerization contaminants and form at least an isomerization feed stream and a first gas stream; contacting at least a portion of the isomerization feed stream with an isomerization catalyst to form an isomerization effluent stream; separating at least the isomerization effluent stream to form at least a first gas stream and an isomerization reactor effluent; contacting at least a portion of the isomerization reactor effluent with the first gas stream such that the isomerization reactor effluent adsorbs at least hydrocarbons having 4 carbons are more from the first gas stream; and stripping at least a portion of the isomerization effluent stream to form at least a product stream and a second gas stream, wherein the product stream comprises renewable diesel and has a minimum flash point of about 35° C. to about 60° C. as determined in accordance with ASTM D93.

Embodiment 2. The method of embodiment 1 further comprising combining at least the first gas stream separated from the isomerization effluent stream with the hydrotreated effluent stream prior to the separating the gas-phase portion such that the separating the gas-phase portion separates at least a combined stream of the first gas stream and the hydrotreated effluent stream.

Embodiment 3. The method of embodiment 1 or embodiment 2 further comprising cooling the isomerization effluent stream prior to the separating the isomerization effluent stream.

Embodiment 4. The method of any preceding embodiment further comprising combining the hydrotreated effluent stream with at least a portion of the first gas stream from the separating the isomerization effluent stream prior to the separating the gas-phase portion.

Embodiment 5. The method of any preceding embodiment, wherein the isomerization contaminants comprise at least one of carbon monoxide, carbon dioxide, or water.

Embodiment 6. The method of any preceding embodiment, wherein the stripping at least a portion of the hydrotreated stream comprises counter current contact with a first stripping medium, and wherein the stripping at least a portion of the isomerization effluent stream comprises counter current with a second stripping medium.

Embodiment 7. The method of any one of embodiments 1 to 5, wherein a stripping medium for at least one of the hydrotreated stream and/or the isomerization effluent stream comprises heat from one or more stripping reboilers.

Embodiment 8. The method of any preceding embodiment, wherein the stripping of at least a portion of the hydrotreated stream is performed in a first separate volume of a tower, wherein the stripping of at least a portion of the isomerization effluent stream is performed in a second separate volume of the tower, wherein the first and second separate volumes are separated by a dividing wall, wherein the contacting of at least a portion of the isomerization reactor effluent with the first gas stream occurs in a common volume that is above the first and second separate volumes, wherein liquid can flow from the common volume to the second separate volume but cannot flow from the common volume to the first separate volume.

Embodiment 9. The method of embodiment 8, wherein vapor from the common volume is condensed in a condenser and separated to form at least a naphtha product stream and a light ends stream comprising carbons having from 1 carbon to 6 carbons.

Embodiment 10. The method of embodiment 9, wherein the condenser comprises of a spiral condenser.

Embodiment 11. The method of any preceding embodiment, further comprising stripping a rich amine stream with at least portion of the gas-phase stream from the separating the gas-phase portion to enrich the gas-phase stream with hydrogen sulfide, wherein the hydrogen for the hydrotreating is provided in a hydrogen treat gas that comprises at least a portion of the enriched gas-phase stream, wherein the rich amine stream has a molar ratio of hydrogen sulfide to amine of 0.25 or more.

Embodiment 12. The method of embodiment 11, further comprising contacting the gas-phase stream with a lean amine stream to strip contaminants from the gas-phase stream prior to the stripping the rich amine stream.

Embodiment 13. The method of any preceding embodiment, wherein the biofeedstock comprises a vegetable oil.

Embodiment 14. A method for integration of product separation in renewable diesel production, comprising: stripping a hydrotreated effluent stream comprising hydrotreated biofeedstock to remove isomerization contaminants and form at least an isomerization feed stream and a first gas stream; contacting an isomerization effluent with the first gas stream such that the isomerization effluent adsorbs at least C4+ hydrocarbons from the first gas stream; and stripping at least a portion of an isomerization effluent in an integrated stripper while separated from the stripping the hydrocarbon stream by a dividing wall to remove hydrocarbons having 10 carbons or less and form at least a product stream and a second gas stream, wherein the product stream comprises renewable diesel.

Embodiment 15. The method of embodiment 14, wherein the isomerization contaminants comprise at least one of carbon monoxide, carbon dioxide, or water.

Embodiment 16. The method of embodiment 14 or embodiment 15, wherein the stripping at least a portion of the hydrotreated stream comprising counter currently contacting the hydrotreated stream with a first stripping medium, and wherein the stripping at least a portion of the isomerization effluent stream comprises counter currently contacting the at least a portion of the isomerization effluent stream with a second stripping medium.

Embodiment 17. The method of embodiment 16, wherein the first stripping medium and the second stripping medium each individually comprise natural gas, steam, an inert gas, or combinations thereof.

Embodiment 18. The method of any one of embodiments 14 to 17, wherein the stripping the at least a portion of the hydrotreated stream is performed in a first separate volume of a tower, where the stripping at least a portion of the isomerization effluent stream is performed in a second separate volume of the tower, wherein the first and second separate volumes are separated by a dividing wall, and wherein the contacting at least a portion of the isomerization reactor effluent with the first gas stream occurs in a common volume that is above the first and second separate volumes.

Embodiment 19. The method of embodiment 18, wherein vapor from the common volume is condensed and separated to form at least a naphtha product stream and a light ends stream comprising carbons having from 1 carbon to 6 carbons.

Embodiment 20. The method of any one of embodiments 14 to 19, wherein the hydrotreated biofeedstock comprises hydrotreated vegetable oil.

To facilitate a better understanding of the embodiments described herein, the following examples of certain aspects of some embodiments are given. In no way should the following examples be read to limit, or define, the scope of the present disclosure.

Examples

To illustrate integrated stripping, a simulation was performed with an integrated stripper 122 configured as shown in FIG. 2. The integrated stripped 122 used in this example had a dividing wall 134 separating the first and second separate volumes 130, 132. A hydrotreated stream 128 was fed to the first separate volume 130 where it was stripped with natural gas at 125 psig (862 kpa) and 38° C. as the first stripping medium 212. The stripping section with natural gas had 5 theoretical stages.

The gas from the first separate volume (e.g., shown on FIG. 2 as first gas stream 131) from the first separate volume passed through a chimney tray (shown on FIG. 2 as tray 200) where it counter currently contacts an isomerization reactor effluent 142 in common volume 136. This isomerization reactor effluent is then fed to the other size of the dividing wall 134 in the second separate volume 132 where it is stripped with steam at 125 psig (862 kpag) as the second stripping medium 230. The integrated stripper is operated at a pressure of 70 psig (483 kpag) and overhead temperature of 170° F. (77° C.). The second separate volume 132 is operated with a bottoms temperature of 404° F. (207° C.). The isomerization reactor effluent stripping is done using steam. The stripping of isomerization reactor effluent was simulated using 11 theoretical stages with isomerization reactor effluent fed on stage 4 and the feed from first separate volume 130 was fed on stage 7.

The overhead from the common volume 136 is fed to a condenser 208. The overhead condensed naphtha and water (e.g., hydrocarbon stream 228 and water stream 226 on FIG. 2) are separated in separator 224. The naphtha is fed back into the integrated stripper 122. A side stream is removed from the integrated stripper 122 as a green naphtha product (e.g., naphtha product stream 146). A product stream 148 including renewable diesel is withdrawn from the second separate volume 132 and an isomerization feed stream 108 is withdrawn from the first separate volume 130.

The simulated feeds to the integrated stripper 122 are provided in the table below. In the following table, NBP refers to "Normal Boiling Point."

TABLE 1

|  | Hydrotreated Stream 128 | Isomerization Reactor Effluent 142 |
|---|---|---|
| Temperature | 350° F. (177° C.) | 500° F. (260° C.) |
| Pressure | 625 psig (4309 kpag) | 790 psig (5500 kpag) |
| Rate | 131430 lb/hr (59616 kg/hr) | 112468 lb/hr (51015 kg/hr) |
| Molar Composition |  |  |
| $H_2$ | 3.87 | 9.61 |
| CO | 0.17 | 0.00 |
| $CO_2$ | 0.15 | 0.00 |
| $H_2O$ | 0.23 | 0.00 |
| $H_2S$ | 0.03 | 0.00 |
| C1-C2 | 2.42 | 0.27 |
| C3 | 22.82 | 2.14 |
| C4-C6 | 6.71 | 4.95 |
| NBP 60-350 | 5.75 | 10.06 |
| NBP 350-650 | 56.18 | 69.62 |
| NBP 650+ | 1.65 | 3.24 |

The simulated products from the integrated stripper 122 are provided in the table below. The product stream 148 is shown with 3.57 mole % of water was sent through simulated product treatment, including a salt dryer to bring the water content down to 0.01 mole %.

TABLE 2

|  | Isomerization Feed Stream 108 | Light ends stream 144 | Naphtha Product Stream 146 (Green Naphtha Product) | Product Stream 148 (Renewable Diesel) |
|---|---|---|---|---|
| Temperature | 348° F. (177° C.) | 170° F. (77° C.) | 170° F. (77° C.) | 404° F. (207° C.) |
| Pressure | 800 psig (5520 kpag) | 70 psig 480 (kpag) | 70 psig 480 (kpag) | 70 psig 480 (kpag) |
| Total Mass Rate | 121,879 lb/hr (55,280 kg/hr) | 13,367 lb/hr (6,060 kg/hr) | 890 lb/hr (400 kg/hr) | 108,545 lb/hr (49,230 kg/hr) |
| Total Molar Comp. Percent |  |  |  |  |
| H2 | 0.00 | 23.65 | 0.20 | 0.00 |
| CO | 0.00 | 0.36 | 0.01 | 0.00 |
| CO2 | 0.01 | 0.32 | 0.02 | 0.00 |
| H2O | 0.01 | 5.22 | 0.40 | 3.57 |
| H2S | 0.00 | 0.05 | 0.01 | 0.00 |
| C1-C2 | 1.55 | 6.07 | 0.42 | 0.00 |
| C3 | 7.03 | 41.15 | 13.49 | 0.01 |
| C4-C6 | 3.70 | 15.97 | 20.97 | 0.05 |
| NBP 60-350 | 6.18 | 7.09 | 64.43 | 7.58 |
| NBP 350-650 | 79.12 | 0.00 | 0.05 | 84.73 |
| NBP 650+ | 2.33 | 0.00 | 0.00 | 3.94 |

While the invention has been described with respect to a number of embodiments and examples, those skilled in the art, having benefit of this disclosure, will appreciate that other embodiments can be devised which do not depart from the scope and spirit of the invention as disclosed herein. Although individual embodiments are discussed, the invention covers all combinations of all those embodiments.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

The phrase "major amount" or "major component" as it relates to components included within the renewable diesel of the specification and the claims means greater than or equal to 50 wt. %, or greater than or equal to 60 wt. %, or greater than or equal to 70 wt. %, or greater than or equal to 80 wt. %, or greater than or equal to 90 wt. % based on the total weight of the thermal management fluid. The phrase "minor amount" or "minor component" as it relates to components included within the renewable diesel of the specification and the claims means less than 50 wt. %, or less than or equal to 40 wt. %, or less than or equal to 30 wt. %, or greater than or equal to 20 wt. %, or less than or equal to 10 wt. %, or less than or equal to 5 wt. %, or less than or equal to 2 wt. %, or less than or equal to 1 wt. %, based on the total weight of the thermal management fluid. The phrase "substantially free" or "essentially free" as it relates to components included within the renewable diesel of the specification and the claims means that the particular component is at 0 weight % within the renewable diesel, or alternatively is at impurity type levels within the renewable diesel (less than 100 ppm, or less than 20 ppm, or less than 10 ppm, or less than 1 ppm).

All numerical values within the detailed description herein are modified by "about" the indicated value, and take into account experimental error and variations that would be expected by a person having ordinary skill in the art For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

What is claimed is:

1. A method of processing a biofeedstock, comprising:
hydrotreating the biofeedstock by reaction with hydrogen in the presence of a hydrodeoxygenation catalyst to form at least a hydrotreated effluent stream;
separating a gas-phase portion from at least the cooled hydrotreated effluent stream to form at least a gas-phase stream and a hydrotreated stream;
stripping at least a portion of the hydrotreated stream in an integrated stripper to remove isomerization contaminants and form at least an isomerization feed stream and a first gas stream;
contacting at least a portion of the isomerization feed stream with an isomerization catalyst to form an isomerization effluent stream;
separating at least the isomerization effluent stream to form at least a second gas stream and an isomerization reactor effluent;
contacting at least a portion of the isomerization reactor effluent with the first gas stream in a common volume of the integrated stripper such that the isomerization reactor effluent adsorbs at least hydrocarbons having 4 carbons or more from the first gas stream; and
stripping at least a portion of the isomerization effluent stream in the integrated stripper to form at least a product stream and a third gas stream, wherein the stripping of at least a portion of the hydrotreated stream is performed in a first separate volume of the integrated stripper and the stripping of at least a portion of the isomerization effluent stream is performed in a second separate volume of the integrated stripper, and wherein the product stream comprises renewable diesel and has a minimum flash point of about 35° C. to about 60° C. as determined in accordance with ASTM D93.

2. The method of claim 1 further comprising combining at least the second gas stream separated from the isomerization effluent stream with the hydrotreated effluent stream prior to the separating the gas-phase portion such that the separating the gas-phase portion separates at least a combined stream of the second gas stream and the hydrotreated effluent stream.

3. The method of claim 1 further comprising cooling the isomerization effluent stream prior to the separating the isomerization effluent stream.

4. The method of claim 1 further comprising combining the hydrotreated effluent stream with at least a portion of the second gas stream from the separating the isomerization effluent stream prior to the separating the gas-phase portion.

5. The method of claim 1, wherein the isomerization contaminants comprise at least one of carbon monoxide, carbon dioxide, or water.

6. The method of claim 1, wherein the stripping at least a portion of the hydrotreated stream comprises counter current contact with a first stripping medium within the integrated stripper, and wherein the stripping at least a portion of the isomerization effluent stream comprises counter current with a second stripping medium within the integrated stripper.

7. The method of claim 1, wherein a stripping medium for at least one of the hydrotreated stream and/or the isomerization effluent stream comprises heat from one or more stripping reboilers.

8. The method of claim 1, wherein the first and second separate volumes are separated by a dividing wall, wherein the common volume is above the first and second separate volumes, wherein liquid can flow from the common volume to the second separate volume but cannot flow from the common volume to the first separate volume.

9. The method of claim 8, wherein vapor from the common volume is condensed in a condenser and separated to form at least a naphtha product stream and a light ends stream comprising carbons having from 1 carbon to 6 carbons.

10. The method of claim 9, wherein the condenser comprises of a spiral condenser.

11. The method of claim 1, further comprising stripping a rich amine stream with at least portion of the gas-phase stream from the separating the gas-phase portion to enrich the gas-phase stream with hydrogen sulfide, wherein the hydrogen for the hydrotreating is provided in a hydrogen treat gas that comprises at least a portion of the enriched gas-phase stream, wherein the rich amine stream has a molar ratio of hydrogen sulfide to amine of 0.25 or more.

12. The method of claim 11, further comprising contacting the gas-phase stream with a lean amine stream to strip contaminants from the gas-phase stream prior to the stripping the rich amine stream.

13. The method of claim 1, wherein the biofeedstock comprises a vegetable oil.

14. A method for integration of product separation in renewable diesel production, comprising:
    stripping a hydrotreated effluent stream comprising hydrotreated biofeedstock to remove isomerization contaminants and form at least an isomerization feed stream and a first gas stream;
    contacting at least a portion of the isomerization feed stream with an isomerization catalyst to form an isomerization effluent stream;
    contacting the isomerization effluent stream with the first gas stream within a common area of an integrated stripper such that the isomerization effluent adsorbs at least $C_{4+}$ hydrocarbons from the first gas stream; and
    stripping at least a portion of an isomerization effluent stream in the integrated stripper, wherein stripping the at least a portion of the hydrotreated effluent stream is performed in a first separate volume of the integrated stripper and the stripping at least a portion of the isomerization effluent stream is performed in a second separate volume of the integrated stripper and the first and second volumes are separated by a dividing wall to form at least a second gas stream and a product stream, wherein the product stream comprises renewable diesel.

15. The method of claim 14, wherein the isomerization contaminants comprise at least one of carbon monoxide, carbon dioxide, or water.

16. The method of claim 14, wherein the stripping at least a portion of the hydrotreated stream comprising counter currently contacting the hydrotreated stream with a first stripping medium, and wherein the stripping at least a portion of the isomerization effluent stream comprises counter currently contacting the at least a portion of the isomerization effluent stream with a second stripping medium.

17. The method of claim 16, wherein the first stripping medium and the second stripping medium each individually comprise natural gas, steam, an inert gas, or combinations thereof.

18. The method of claim 14, wherein the common volume that is above the first and second separate volumes.

19. The method of claim 18, wherein vapor from the common volume is condensed and separated to form at least a naphtha product stream and a light ends stream comprising carbons having from 1 carbon to 6 carbons.

20. The method of claim 14, wherein the hydrotreated biofeedstock comprises hydrotreated vegetable oil.

* * * * *